United States Patent
Kwak et al.

(10) Patent No.: US 10,819,490 B2
(45) Date of Patent: *Oct. 27, 2020

(54) METHOD AND APPARATUS FOR TRANSMITTING/RECEIVING UPLINK SIGNALING INFORMATION IN A SINGLE CARRIER FDMA SYSTEM

(71) Applicant: Samsung Electronics Co., Ltd., Gyeonggi-do (KR)

(72) Inventors: Yong-Jun Kwak, Gyeonggi-do (KR); Ju-Ho Lee, Gyeonggi-do (KR); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,967

(22) Filed: Jul. 8, 2019

(65) Prior Publication Data

US 2019/0334684 A1    Oct. 31, 2019

Related U.S. Application Data

(63) Continuation of application No. 14/802,447, filed on Jul. 17, 2015, now Pat. No. 10,348,473, which is a
(Continued)

(30) Foreign Application Priority Data

Jan. 6, 2006 (KR) .................. 10-2006-0001849
Jun. 26, 2006 (KR) .................. 10-2006-0057693

(51) Int. Cl.
*H04L 5/00* (2006.01)
*H04L 1/16* (2006.01)
(Continued)

(52) U.S. Cl.
CPC ............. *H04L 5/0055* (2013.01); *H04B 1/69* (2013.01); *H04L 1/0026* (2013.01);
(Continued)

(58) Field of Classification Search
CPC ... H04L 5/0055; H04L 1/0026; H04L 1/0072; H04L 1/1664; H04L 1/1671;
(Continued)

(56) References Cited

U.S. PATENT DOCUMENTS 6,801,770 B2     10/2004  Rinne et al.
8,031,583 B2 *   10/2011  Classon ............... H04L 1/1822
                                              370/208
(Continued)

FOREIGN PATENT DOCUMENTS

CN           1333959        1/2002
JP         2005-151573      6/2005
(Continued)

OTHER PUBLICATIONS

Huawei, Further considerations on multiplexing method of shared Control Channel in Uplink Single-Carrier FDMA, 3GPP TSG-RAN WG1 #43, Seoul, Korea, Nov. 7-11, 2005, R1-051430 (Year: 2005).*

(Continued)

*Primary Examiner* — Shailendra Kumar
(74) *Attorney, Agent, or Firm* — The Farrell Law Firm, P.C.

(57) ABSTRACT

A method and an apparatus method are provided for transmitting uplink information including acknowledgement information in a wireless communication system. The method includes determining whether transmission of acknowledgement information overlaps with transmission of uplink data in a time domain; multiplexing the uplink data and the acknowledgement information, in case that the
(Continued)

transmission of the acknowledgement information overlaps with the transmission of the uplink data in the time domain; and transmitting the multiplexed uplink data and acknowledgement information to a base station. The acknowledgement information is located adjacent to a pilot for the uplink data, and the pilot is used for demodulation of the uplink data.

20 Claims, 20 Drawing Sheets

Related U.S. Application Data continuation of application No. 14/164,959, filed on Jan. 27, 2014, now Pat. No. 9,124,400, which is a continuation of application No. 11/650,896, filed on Jan. 8, 2007, now Pat. No. 8,665,855.

(51) Int. Cl.
| | | |
|---|---|---|
| *H04L 27/26* | (2006.01) | |
| *H04L 1/00* | (2006.01) | |
| *H04B 1/69* | (2011.01) | |
| *H04L 1/18* | (2006.01) | |
| *H04L 5/02* | (2006.01) | |

(52) U.S. Cl.
CPC .......... *H04L 1/0072* (2013.01); *H04L 1/1664* (2013.01); *H04L 1/1671* (2013.01); *H04L 5/0016* (2013.01); *H04L 5/0048* (2013.01); *H04L 5/0057* (2013.01); *H04L 27/2601* (2013.01); *H04L 1/1812* (2013.01); *H04L 5/023* (2013.01); *H04L 27/261* (2013.01)

(58) Field of Classification Search
CPC ... H04L 5/0016; H04L 5/0048; H04L 5/0057; H04L 27/2601; H04L 1/1812; H04L 5/023; H04L 27/261; H04L 1/1861; H04L 5/0044; H04L 1/0031; H04L 27/2602; H04L 5/0007; H04L 5/0053; H04B 1/69
See application file for complete search history.

(56) References Cited

U.S. PATENT DOCUMENTS

| | | | | |
|---|---|---|---|---|
| 8,391,405 B2 * | 3/2013 | Kwon | ................... | H04L 1/0071 375/296 |
| 9,124,400 B2 | 9/2015 | Kwak | | |
| 2003/0130831 A1 | 7/2003 | Adir | | |
| 2005/0002444 A1 | 1/2005 | Wei et al. | | |
| 2005/0105640 A1 | 5/2005 | Han et al. | | |
| 2005/0220042 A1 | 10/2005 | Chang | | |
| 2005/0250497 A1 * | 11/2005 | Ghosh | ....................... | H04L 1/16 455/436 |
| 2005/0286402 A1 * | 12/2005 | Byun | .................... | H04L 1/1692 370/203 |
| 2006/0176859 A1 | 8/2006 | Lee | | |

FOREIGN PATENT DOCUMENTS

| | | |
|---|---|---|
| JP | 2005-244967 | 9/2005 |
| KR | 1020030041728 | 5/2003 |
| KR | 1020050084884 | 8/2005 |
| WO | WO 00/38350 | 6/2000 |
| WO | WO 2006/105005 | 10/2006 |

OTHER PUBLICATIONS

Samsung: Data and Control Channel Multiplexing in SC-FDMA for EUTRA Uplink, 3GPP TSG RAN WG1 Meeting #43, Nov. 7, 2005.
Samsung: Data and Control Multiplexing in SC-FDMA Uplink for Evolved UTRA, 3GPP TSG RAN WG1 Meeting #42, Aug. 29, 2005.
NTT DoCoMo, Fujitsu, NEC, SHARP: Physical Channels and Multiplexing in Evolved UTRA Uplink, 3GPP TSG RAN WG1 #42 on LTE, Aug. 29, 2005.
Samsung: Time vs. Frequency Domain Realization of SC-FDMA Transmissions, 3GPP TSG RAN WG1 Meeting #42, Aug. 29, 2005.
Samsung, "Uplink Transmission and Multiplexing for EUTRA", Online, 3GPP TSG-RAN WG1 Ad-Hoc on LTE, Jun. 20-21, 2005.
Huawei: "Further Considerations on Multiplexing Method of Shared Control Channel in Uplink Single-Carrier FDMA", Online, 3GPP TSG-RAN WG1 #43, Nov. 7-11, 2005.
NTT DoCoMo et al.: Channel-Dependent Scheduling Method for Single-Carrier FDMA Radio Access in Evolved UTRA Uplink, Sep. 2, 2005.
3rd Generation Partnership Project; Technical Specification Group Radio Access Network; Requirements for Evolved UTRA and UTRAN (Release 7), May 2005.
3rd Generation Partnership Project; Technical Specification Group Radio Access Network; Physical Layer Aspects for Evolved UTRA (Release 7), Nov. 2005.
Indian Examination Report dated Oct. 18, 2019 issued in counterpart application No. 1615/MUMNP/2015, 7 pages.

* cited by examiner

METHOD AND APPARATUS FOR TRANSMITTING/RECEIVING UPLINK SIGNALING INFORMATION IN A SINGLE CARRIER FDMA SYSTEM

PRIORITY

This application is a Continuation Application of U.S. patent application Ser. No. 14/802,447, which was filed in the U.S. Patent and Trademark Office (USPTO) on Jul. 17, 2015, which is a Continuation Application of U.S. patent application Ser. No. 14/164,959, which was filed in the USPTO on Jan. 27, 2014, issued as U.S. Pat. No. 9,124,400 on Sep. 1, 2015, which is a Continuation of U.S. application Ser. No. 11/650,896, which was filed in USPTO on Jan. 8, 2007, issued as U.S. Pat. No. 8,665,855 on Mar. 4, 2014, and claims priority under 35 U.S.C. § 119(a) to Korean Application Serial Nos. 10-2006-0001849 and 10-2006-0057693, which were filed in the Korean Industrial Property Office on Jan. 6, 2006 and Jun. 26, 2006, respectively, the entire content of each of which is incorporated herein by reference.

BACKGROUND OF THE INVENTION

1. Field of the Invention

The present invention relates to a method and an apparatus for transmitting/receiving uplink signaling information and uplink data in a Frequency Division Multiple Access (FDMA) wireless communication system using a single carrier.

2. Description of the Related Art

An Orthogonal Frequency Division Multiplexing (OFDM) scheme or a Single Carrier-Frequency Division Multiple Access (SC-FDMA) scheme similar to the OFDM scheme have been actively researched as a scheme available for high speed data transmission through a wireless channel in a mobile communication system.

An OFDM scheme, which transmits data using multiple carriers, is a special type of a Multiple Carrier Modulation (MCM) scheme in which a serial symbol sequence is converted into parallel symbol sequences, and the parallel symbol sequences are modulated with a plurality of mutually orthogonal subcarriers (or subcarrier channels) before being transmitted.

FIG. 1 shows a transmitter of a typical OFDM system. The OFDM transmitter includes a channel encoder 101, a modulator 102, a serial-to-parallel (S/P) converter 103, an Inverse Fast Fourier Transform (IFFT) block or a Digital Fourier Transform (DFT) block 104, a parallel-to-serial (P/S) converter 105, and a Cyclic Prefix (CP) inserter 106.

The channel encoder 101 receives and channel-encodes a predetermined information bit sequence. In general, a convolutional encoder, a turbo encoder, or a Low Density Parity Check (LDPC) encoder is used as the channel encoder 101. The modulator 102 modulates the channel-encoded bit sequence according to a modulation scheme, such as a Quadrature Phase Shift Keying (QPSK) scheme, an 8PSK scheme, a 16-ary Quadrature Amplitude Modulation (16QAM) scheme, a 64QAM scheme, a 256QAM scheme, etc. Meanwhile, although not shown in FIG. 1, it is obvious that a rate matching block for performing repetition and puncturing may be inserted between the channel encoder 101 and the modulator 102.

The S/P converter 103 receives output data from the modulator 102 and converts the received data into parallel data. The IFFT block 104 receives the parallel data output from the S/P converter 103 and performs an IFFT operation on the parallel data. The data output from the IFFT block 104 is converted to serial data by the P/S converter 105. The CP inserter 106 inserts a CP into the serial data output from the P/S converter 105, thereby generating an OFDM symbol to be transmitted.

The IFFT block 104 converts the input data of the frequency domain to output data of the time domain. In a typical OFDM system, because input data is processed in the frequency domain, a Peak to Average Power Ratio (PAPR) of the data may increase when the data have been converted into the time domain.

A PAPR is one of the most important factors to be considered in the uplink transmission. As PAPR increases, the cell coverage decreases, so signal power required by a terminal increases. Therefore, it is necessary to first reduce the PAPR, and it is thus possible to use an SC-FDMA scheme, which is a scheme modified from the typical OFDM scheme, for the OFDM-based uplink transmission. That is to say, it is possible to effectively reduce the PAPR by enabling processing in the time domain without performing processing (channel encoding, modulation, etc.) of data in the frequency domain.

FIG. 2 shows a transmitter in a system employing an SC-FDMA scheme, which is a typical uplink transmission scheme. The SC-FDMA transmitter includes a channel encoder 201, a modulator 202, a serial-to-parallel (S/P) converter 203, a Fast Fourier Transform (FFT) block 204, a sub-carrier mapper 205, an IFFT block 206, a parallel-to-serial (P/S) converter 207, and a CP inserter 208.

The channel encoder 201 receives and channel-encodes a predetermined information bit sequence. The modulator 202 modulates the output of the channel encoder 201 according to a modulation scheme, such as a QPSK scheme, an 8PSK scheme, a 16QAM scheme, a 64QAM scheme, a 256QAM scheme, etc. A rate matching block may be omitted between the channel encoder 201 and the modulator 202.

The S/P converter 203 receives data output from the modulator 202 and converts the received data into parallel data. The FFT block 204 performs an FFT operation on the data output from the S/P converter 203, thereby converting the data into data of the frequency domain. The sub-carrier mapper 205 maps the output data of the FFT block 204 to the input of the IFFT block 206. The IFFT block 206 performs an IFFT operation on the data output from the sub-carrier mapper 205. The output data of the IFFT block 206 is converted to parallel data by the P/S converter 207. The CP inserter 208 inserts a CP into the parallel data output from the P/S converter 207, thereby generating an OFDM symbol to be transmitted.

FIG. 3 shows in more detail the structure for resource mapping shown in FIG. 2. Hereinafter, the operation of the sub-carrier mapper 205 will be described with reference to FIG. 3. Data symbols 301 having been subjected to the channel encoding and modulation are input to an FFT block 302. The output of the FFT block 302 is input to an IFFT block 304. A sub-carrier mapper 303 maps the output data of the FFT block 302 to the input data of the IFFT block 304.

The sub-carrier mapper 303 maps the information symbols of the frequency domain data converted by the FFT block 302 to corresponding input points or input taps of the IFFT block 304 so the information symbols can be carried by proper sub-carriers.

During the mapping procedure, when the output symbols of the FFT block 302 are sequentially mapped to neighboring input points of the IFFT block 304, the output symbols are transmitted by sub-carriers that are consecutive in the frequency domain. This mapping scheme is called a Localized Frequency Division Multiple Access (LFDMA) scheme.

Further, when the output symbols of the FFT block 302 are mapped to input points of the IFFT block 304 having a predetermined interval between them, the output symbols are transmitted by sub-carriers having equal intervals between them in the frequency domain. This mapping scheme is called either an Interleaved Frequency Division Multiple Access (IFDMA) scheme or a Distributed Frequency Division Multiple Access (DFDMA) scheme.

Although FIGS. 2 and 3 show one method of implementing the SC-FDMA technology in the frequency domain, it is also possible to use various other methods, such as a method of implementing the technology in the time domain.

Diagrams (a) and (b) in FIG. 4 are views for comparison between the positions of sub-carriers used for the DFDMA and the LFDMA in the frequency domain. In diagram (a), the transmission symbols of a terminal using the DFDMA scheme are distributed with equal intervals over the entire frequency domain (that is, the system band). In diagram (b), the transmission symbols of a terminal using the LFDMA scheme are consecutively located at some part of the frequency domain.

According to the LFDMA scheme, because consecutive parts of the entire frequency band are used, it is possible to obtain a frequency scheduling gain by selecting a partial frequency band having good channel gain in the frequency selective channel environment in which severe channel change of frequency bands occurs. In contrast, according to the DFDMA scheme, it is possible to obtain a frequency diversity gain as transmission symbols have various channel gains by using a large number of sub-carriers distributed over a wide frequency band.

In order to maintain a characteristic of a single carrier as described above, simultaneously transmitted information symbols should be mapped to the IFFT block so they can always satisfy the LFDMA or DFDMA after passing through a single FFT block (or DFT block).

In an actual communication system, various information symbols may be transmitted. For example, in the uplink of a Long Term Evolution (LTE) system using the SC-FDMA based on a Universal Mobile Telecommunications System (UMTS), uplink data, control information regulating a transport scheme of the uplink data (which includes Transport Format (TF) information of the uplink data and/or Hybrid Automatic Repeat reQuest (HARQ) information), an ACKnowledgement/Negative ACKnowledgement (ACK/NACK) for a HARQ operation for downlink data, a Channel Quality Indication (CQI) indicating the channel status reported to be used for scheduling of a base station, etc. may be transmitted. Those enumerated information items have different transmission characteristics, respectively.

Uplink data can be transmitted in a situation in which a terminal has data in a transmission buffer of the terminal and has received permission for uplink transmission from a base station. The control information regulating the transport scheme of the uplink data is transmitted only when the uplink data is transmitted. Sometimes, uplink data may be transmitted without transmission of control information. In contrast, the ACK/NACK, which is transmitted in response to downlink data, has no relation to transmission of uplink data. That is, either both the uplink data and the ACK/NACK may be simultaneously transmitted or only one of them may be transmitted. Further, the CQI, which is transmitted at a given time, also has no relation to transmission of uplink data. That is, either both the uplink data and the CQI may be simultaneously transmitted or only one of them may be transmitted.

As described above, various types of uplink information are transmitted in the SC-FDMA system. Under the restriction of use of a single FFT block, which is a characteristic of a single sub-carrier, it is necessary to effectively control transmission of information in order to transmit various types of information as described above. That is to say, it is necessary to arrange a specific transmission rule when only uplink data is transmitted, when only an ACK/NACK or a CQI is transmitted, and when both uplink data and uplink signaling information (ACK/NACK or CQI) are transmitted.

SUMMARY OF THE INVENTION

Accordingly, the present invention has been made to solve the above-mentioned problems occurring in the prior art, and provides a method and an apparatus for transmitting uplink information items having various characteristics by using a single FFT block.

The present invention also provides a method and an apparatus for transmitting uplink signaling information, such as ACK/NACK or CQI, according to existence or absence of uplink data.

The present invention also provides a method and an apparatus for indicating whether the uplink signaling information, such as ACK/NACK or CQI, uses resources allocated to uplink data in transmission of the uplink data.

In accordance with an aspect of the present invention, a method is provided for transmitting acknowledgement information by a terminal in a wireless communication system. The method includes determining whether transmission of acknowledgement information overlaps with transmission of uplink data in a time domain; multiplexing the uplink data and the acknowledgement information, in case that the transmission of the acknowledgement information overlaps with the transmission of the uplink data in the time domain; and transmitting the multiplexed uplink data and acknowledgement information to a base station. The acknowledgement information is located adjacent to a pilot for the uplink data, and the pilot is used for demodulation of the uplink data.

In accordance with another aspect of the present invention, a method is provided for receiving acknowledgement information by a base station in a wireless communication system. The method includes receiving the acknowledgement information and uplink data; and de-multiplexing the uplink data and the acknowledgement information, in case that reception of the acknowledgement information overlaps with reception of the uplink data in a time domain. The acknowledgement information is located adjacent to a pilot for the uplink data, and the pilot is used for demodulation of the uplink data.

In accordance with another aspect of the present invention, a terminal is provided for transmitting acknowledgement information in a wireless communication system. The terminal includes a transceiver; and a controller coupled with the transceiver and configured to determine whether transmission of acknowledgement information overlaps with transmission of uplink data in a time domain, multiplex the uplink data and the acknowledgement information, in case that the transmission of the acknowledgement information overlaps with the transmission of the uplink data in the time domain, and transmit the multiplexed uplink data and acknowledgement information to a base station. The acknowledgement information is located adjacent to a pilot for the uplink data, and the pilot is used for demodulation of the uplink data.

In accordance with another aspect of the present invention, a base station is provided for receiving acknowledgement information in a wireless communication system. The base station includes a transceiver; and a controller coupled with the transceiver and configured to receive the acknowledgement information and uplink data, and de-multiplex the uplink data and the acknowledgement information, in case that reception of the acknowledgement information overlaps with reception of the uplink data in a time domain. The acknowledgement information is located adjacent to a pilot for the uplink data, and the pilot is used for demodulation of the uplink data.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Hereinafter, various embodiments of the present invention will be described with reference to the accompanying drawings. In the following description, a detailed description of known functions and configurations incorporated herein will be omitted when it may make the subject matter of the present invention rather unclear. Further, in the following description of the present invention, various specific definitions are provided only to help general understanding of the present invention, and it is apparent to those skilled in the art that the present invention can be implemented without such definitions.

The present invention multiplexes different types of uplink information to enable transmission of the uplink information, which can satisfy a single carrier characteristic in a wireless communication system using a Single Carrier Frequency Division Multiple Access (SC-FDMA) scheme. The following description discusses multiplexing for uplink transmission of uplink data, control information, Acknowledgement/Negative ACKnowledgement (ACK/NACK), Channel Quality Indication (CQI), etc. in an SC-FDMA wireless communication system. As used herein, the other information except for the uplink data and control information thereof, that is, information including ACK/NACK and CQI, is referred to as "uplink signaling information."

Figure 5:
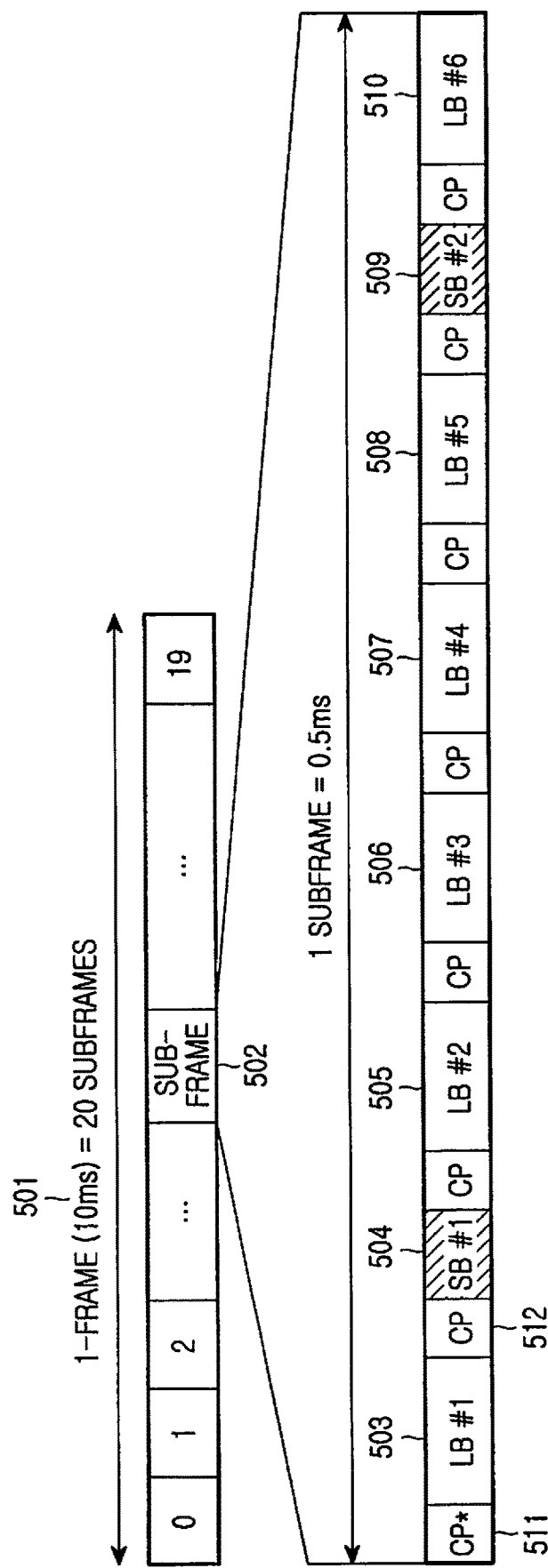
FIG. 5 illustrates structures of an uplink transmission frame and its sub-frame of an LTE system according to the present invention.

A Long Term Evolution (LTE) system, which is being standardized by the 3' Generation Partnership Project (3GPP), is discussed in order to describe the present invention. The LTE system employs a SC-FDMA scheme for uplink transmission. FIG. 5 shows an uplink transmission frame and its sub-frame according to the present invention.

In FIG. 5, reference numeral 501 denotes a radio frame, which is an uplink transmission unit and is defined to have a length of 10 ms. One radio frame 501 includes 20 sub-frames 502, each of which has a length of 0.5 ms. Further, each sub-frame 502 includes six Long Blocks (LBs) 503, 505, 506, 507, 508, and 510, two Short Blocks (SBs) 504 and 509, and CPs 511 and 512 located before the blocks one before one. The LBs 503 to 510 carry information except for pilots used as a reference for coherent modulation, and SBs 504 and 509 are used to carry the pilots.

Figure 6:
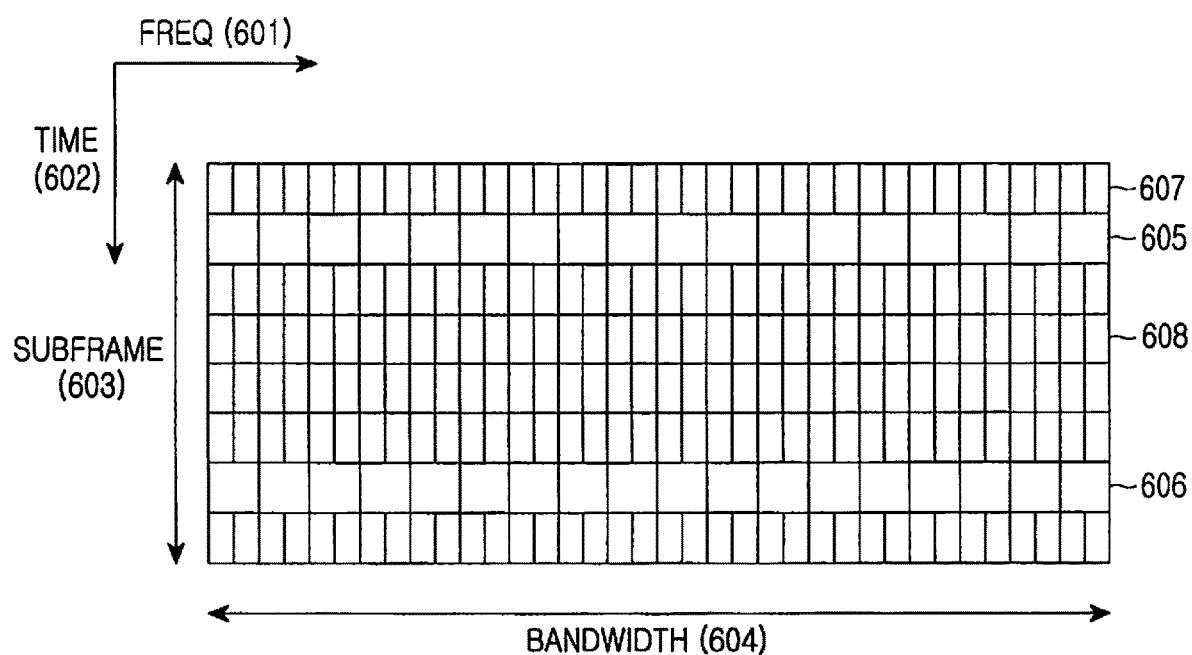
FIG. 6 illustrates the sub-frame 502 of FIG. 5 on the time domain and the frequency domain according to the present invention.

FIG. 6 shows the sub-frame 502 of FIG. 5 on the time domain and the frequency domain according to the present invention. The horizontal axis indicates the frequency domain 601 and the vertical axis indicates the time domain 602. The range of the frequency domain 601 corresponds to the entire frequency band 604 and the range of the time domain 602 corresponds to one sub-frame 603. As noted, the SBs 605 and 607 carry pilots, and the LBs 607 and 608 carry other information except for the pilots.

As described above, uplink data transmitted according to resource allocation by a base station, control information in relation to the uplink data, ACK/NACK for indicating success or failure in reception of downlink data, CQI for indicating a channel status, etc. are transmitted by using the uplink resource.

A determination to transmit the uplink data is made according to scheduling of a base station, and a determination of a resource to be used is also made according to allocation by the base station. The control information transmitted together with the uplink data is also transmitted according to the resources allocated by the base station. In contrast, since the ACK/NACK is generated based on downlink data, the ACK/NACK is transmitted using an uplink resource automatically allocated according to whether the downlink data is transmitted, in response to the control channel defining the downlink data or the downlink data channel. Further, since it is usual that the CQI is periodically transmitted, the CQI is transmitted using a resource determined in advance through setup by higher signaling.

Because the information items use a variety of resource allocation methods as described above, the variety of resource allocation methods are simultaneously used when various types of information are transmitted together. In order to satisfy a characteristic of a single sub-carrier, the resource used during one sub-frame must necessarily maintain a characteristic of the LFDMA or DFDMA. For example, when uplink data and ACK/NACK are transmitted simultaneously, that is, during one Transmission Time Interval (TTI), the uplink data uses the resource allocated by the base station, and the ACK/NACK uses a resource determined by another method, for example, a resource determined according to a control channel for downlink data. Therefore, use of the two resources may cause a contradiction to a characteristic of a single sub-carrier, thereby increasing the PAPR. Therefore, the present invention provides a method by which simultaneously transmitted information items can always maintain a characteristic of a single sub-carrier.

Specifically, transmission of uplink data and ACK/NACK together will be described hereinafter. The transmission of uplink data may be accompanied with transmission of control information of the uplink data. Further, the discussion below may also be applied to other uplink signaling information, such as the CQI instead of the ACK/NACK.

In order to always maintain a characteristic of a single sub-carrier either when only one of the ACK/NACK and the uplink data is transmitted or when both of them are simultaneously transmitted, the present invention provides the following method. That is, when only one of the ACK/NACK and the uplink data is transmitted, a resource allocated to the corresponding information is used. Specifically, when only the uplink data is transmitted, the uplink data is transmitted by using the resource allocated by the base station. When only the ACK/NACK is transmitted, the ACK/NACK is transmitted by using the resource determined for the transmission of the ACK/NACK. However, when both of the ACK/NACK and the uplink data are simultaneously transmitted, the ACK/NACK and the uplink data are transmitted by using only the resource allocated for the uplink data, and the resource determined for the transmission of the ACK/NACK is disregarded. In other words, the ACK/NACK and the uplink data are simultaneously transmitted by using the resource allocated for the uplink data.

Figure 7:
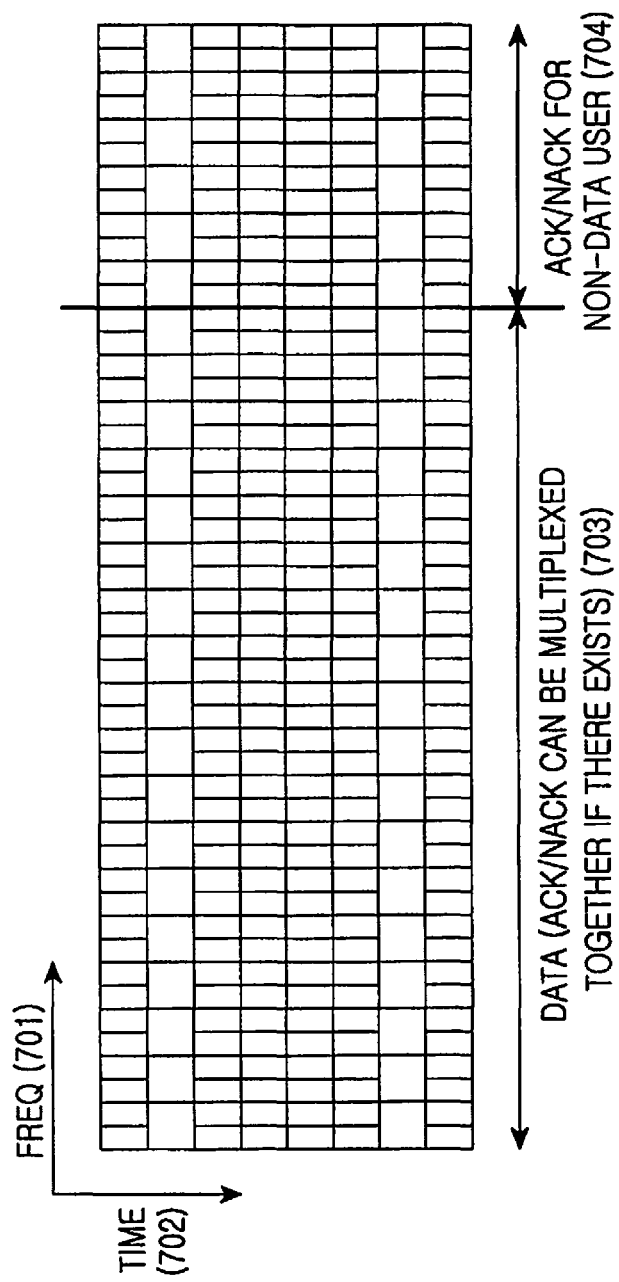
FIG. 7 illustrates the resources allocated to uplink data and ACK/NACK according to the present invention.

FIG. 7 shows resources allocated to uplink data and ACK/NACK according to the present invention. Reference numeral 701 denotes a frequency domain and reference numeral 702 denotes a time domain. Further, within one time interval, sub-carriers allocated to data corresponds to a first resource 703 and sub-carriers allocated to the ACK/NACK corresponds to a second resource 704. The resources 703 and 704 allocated to the uplink data and the ACK/NACK as described above are separated on the frequency domain. Although FIG. 7 shows logical separation between the resources 703 and 704 allocated to the uplink data and the ACK/NACK, the resources 703 and 704 are separated into two sub-carrier sets not only when the LFDMA is used but also when the DFDMA is used.

When the entire frequency resources have been divided into two sub-carrier sets, uplink data is transmitted by using a first resource 703 when there exists only the uplink data, while ACK/NACK is transmitted by using a second resource 704 when only the ACK/NACK exists. In contrast, when both the uplink data and the ACK/NACK exist, both the uplink data and the ACK/NACK are multiplexed and transmitted by using only the first resource 703 without using the second resource 704.

That is, the transmission point of the ACK/NACK changes according to whether uplink data exists. In transmitting the uplink data, the quantity of information is different and the transport format of the uplink data is thus different according to whether the ACK/NACK exists. Therefore, the type and quantity of information to be transmitted should be promised in advance between the base station and the terminal.

When the terminal transmits only the uplink data and the base station misunderstands that the terminal has transmitted both the uplink data and the ACK/NACK, it is impossible to expect a normal communication because encoding and decoding are performed according to different encoding/decoding schemes. For example, such a communication error may occur when the terminal has successfully received scheduling information for the uplink data but has failed to receive downlink data, and determines that there is no downlink data without sending an ACK/NACK. Therefore, it is necessary for the base station to exactly understand the type and quantity of information transmitted by the terminal. For example, the base station determines the type of the information received from the terminal either by analyzing the information transmitted by the terminal or according to whether the base station has transmitted downlink data to the terminal. For another example, the terminal may clearly report the type of uplink information to the base station.

First Embodiment

According to the first embodiment of the present invention, the terminal may inform the base station whether the uplink signaling information (specifically, the ACK/NACK) will be transmitted. Hereinafter, use of frequency-time resources according to the first embodiment of the present invention will be described with reference to FIG. 8.

Figure 8:
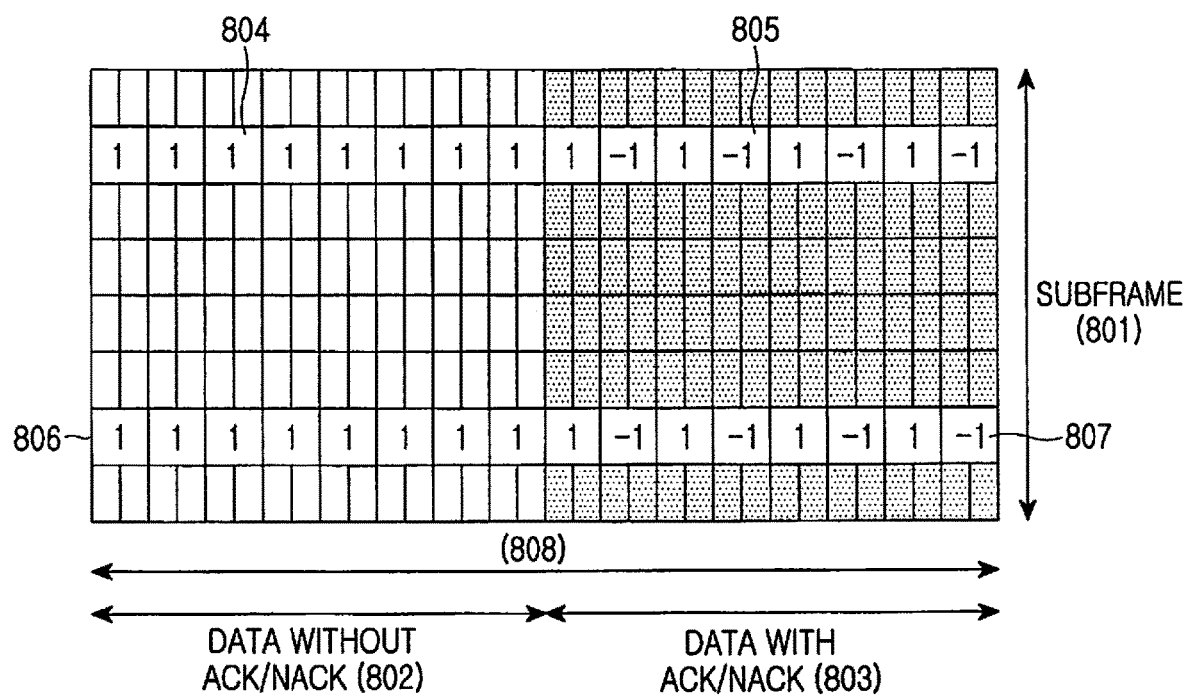
FIG. 8 illustrates use of frequency-time resources according to the first embodiment of the present invention.

In FIG. 8, reference numeral 801 denotes one sub-frame used in the uplink of an LTE system, and reference numeral 808 denotes the frequency band allocated for transmission of data. In the frequency band 808, reference numeral 802 denotes a first sub-carrier set allocated to a first terminal that transmits uplink data without ACK/NACK, and reference numeral 803 denotes a second sub-carrier set allocated to a second terminal that transmits uplink data together with ACK/NACK.

In the first sub-carrier set 802, pilots 804 and 806 for channel estimation are transmitted through the allocated time resource. Pilots 804 and 806 have a sequence with a pilot pattern known to the base station and the terminal, representatives of which includes an all 1 sequence (all bits of which have a value of 1). That is, pilots 804 and 806 for sub-carrier set 802 without ACK/NACK are set to have a representative sequence such as an all 1 sequence. In contrast, pilots 805 and 807 for the second sub-carrier set 803 carrying the ACK/NACK are set to have a sequence different from that of pilots 804 and 806. That is, sub-carrier set 803 uses a pilot other than the all 1 sequence. For example, it uses a pilot having a sequence in which 1 and −1 are alternately repeated. At this time, by setting the minimum distance between the two different sequences to be largest, it is possible to minimize the probability of error in discriminating between the two sequences by the base station.

In brief, the terminal informs the base station through pilots having sequences of different pilot patterns of whether the ACK/NACK is simultaneously transmitted together with uplink data.

Figure 9:
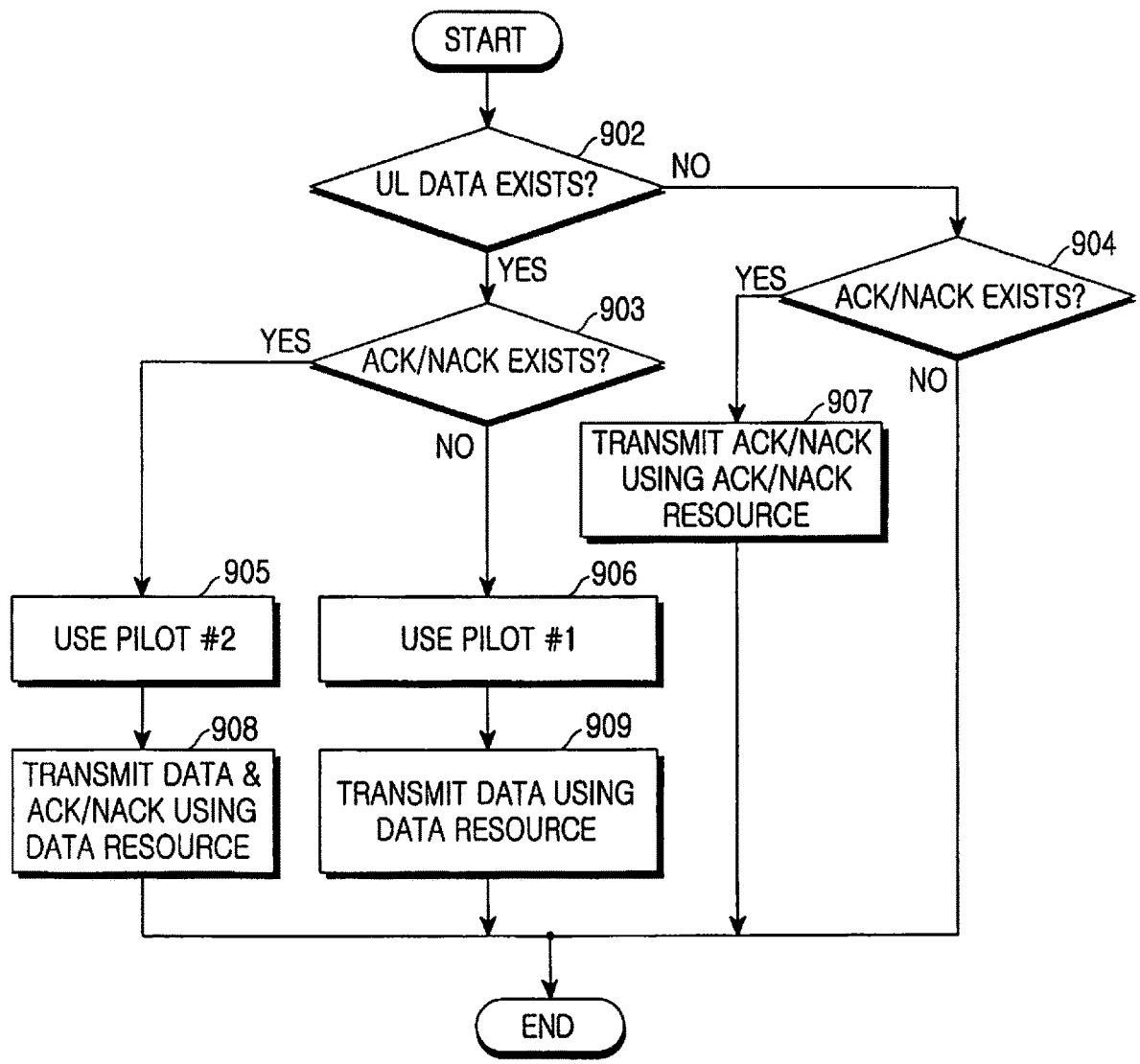
FIG. 9 is a flow diagram of an operation of a transmitter according to the first embodiment of the present invention.
Figure 10:
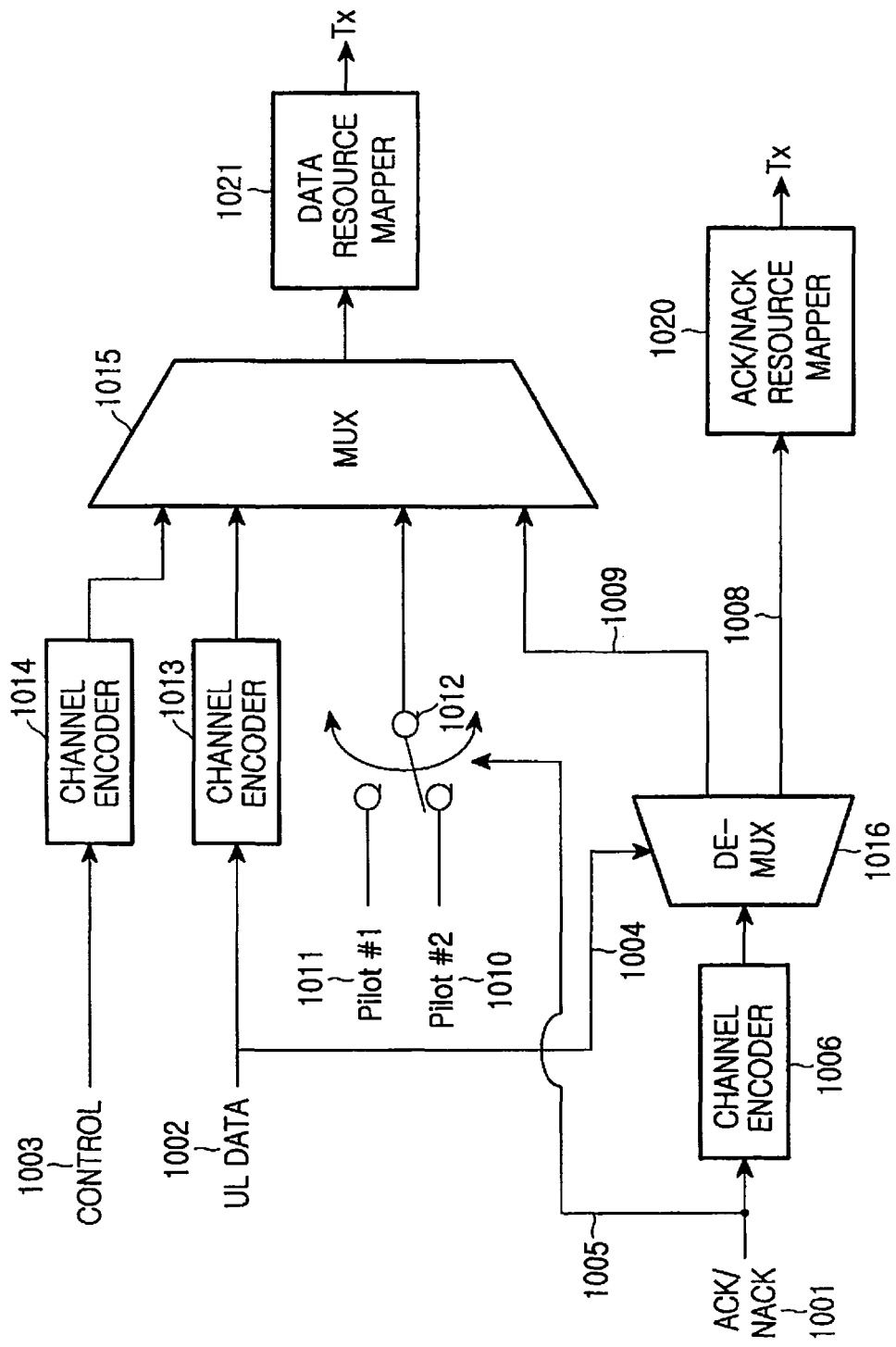
FIG. 10 is a block diagram illustrating the structure of the transmitter according to the first embodiment of the present invention.

FIG. 9 shows an operation of a transmitter (terminal) according to the first embodiment of the present invention, and FIG. 10 shows the transmitter (terminal). Referring to FIG. 9, when the operation of the terminal has started, the terminal determines whether data to be transmitted exists in step 902. When data exists to be transmitted by the terminal, the terminal is instructed through scheduling of the base station, etc. When the determination in step 902 concludes that data exists to be transmitted and the base station has allocated a resource for transmission of the data, the terminal determines whether ACK/NACK exists to be transmitted (step 903). When ACK/NACK exists to be transmitted the information is determined through an HARQ operation for downlink data and based on whether the downlink data has been received.

When it has been determined in step 903 that there is ACK/NACK to be transmitted, the terminal sets pilot pattern #2 having a predetermined sequence as a pilot signal for the data and multiplexes the data, the ACK/NACK, and control information for the data in step 905. Then, in step 908, the terminal maps the multiplexed information to the data resource allocated by the base station, as described above, and then transmits the mapped information. At this time, the pilot signal of pilot pattern #2 is also transmitted through short blocks, which are predetermined time resources of the data resources.

In contrast, when it has been determined in step 903 that no ACK/NACK is to be transmitted, the terminal sets pilot pattern #1 having a predetermined sequence as a pilot signal for the data and multiplexes the data and control information for the data in step 906. Then, in step 909, the terminal maps the multiplexed information to the data resource allocated by the base station as described above and then transmits the mapped information. At this time, the pilot signal of pilot pattern #1 is also transmitted through short blocks, which are predetermined time resources of the data resources. Steps 905 and 906 may be omitted when the terminal does not clearly inform the base station whether the terminal will transmit ACK/NACK.

Meanwhile, when the determination in step 902 concludes that no uplink data is to be transmitted, the terminal determines whether ACK/NACK exists to be transmitted in step 904. When ACK/NACK exists to be transmitted, the terminal transmits the ACK/NACK by using a resource allocated for the ACK/NACK, that is, by using an ACK/NACK resource corresponding to the resource of the downlink data in step 907. In contrast, when no ACK/NACK is to be transmitted, the process is terminated.

Referring to the transmitter shown in FIG. 10, ACK/NACK 1001 for downlink data is subjected to an encoding, such as a repetition coding by a channel encoder 1006, and is then input to a demultiplexer (DEMUX) 1016. The output path from the DEMUX 1016 depends on a signal 104 indicating whether uplink data 1002 exists. Specifically, the DEMUX 1016 is connected to output to path 1009 when uplink data 1002 exists. Otherwise, the DEMUX 1016 is connected to output path 1008.

The uplink data 1002 is encoded by a channel encoder 1013 and is then input to a multiplexer 1015, while the control information 1003 indicating the transport format of the uplink data 1002 is encoded by a channel encoder 1014, and is then input to the multiplexer 1015. Further, the encoded ACK/NACK may be input to the multiplexer 1015 through output path 1009. One of the pilot signals 1011 and 1012 for the resource (data resource) allocated for the uplink data 1002 is input through the switch 1012 to the multiplexer 1015. The selection by the switch 1012 depends on a signal 105 indicating whether ACK/NACK exists. Specifically, the switch 1012 selects the pilot signal 1011 of pilot pattern #1 when the ACK/NACK is not transmitted to the data resource, and selects the pilot signal 1012 of pilot pattern #2 when the ACK/NACK is transmitted to the data resource.

Figure 1:
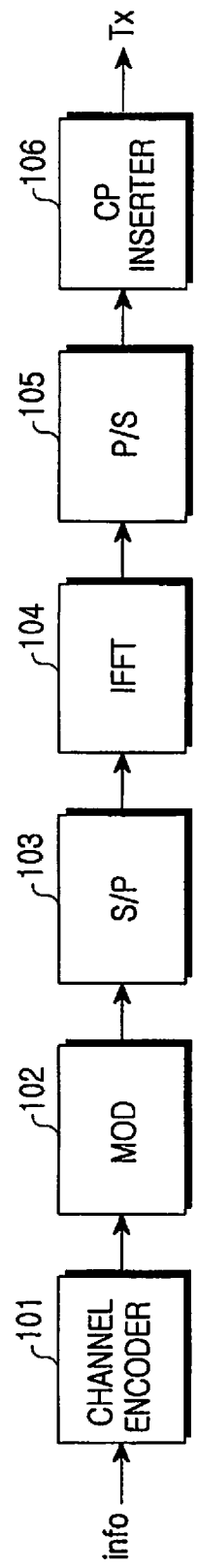
FIG. 1 is a block diagram illustrating a structure of a transmitter of a typical OFDM system.
Figure 2:
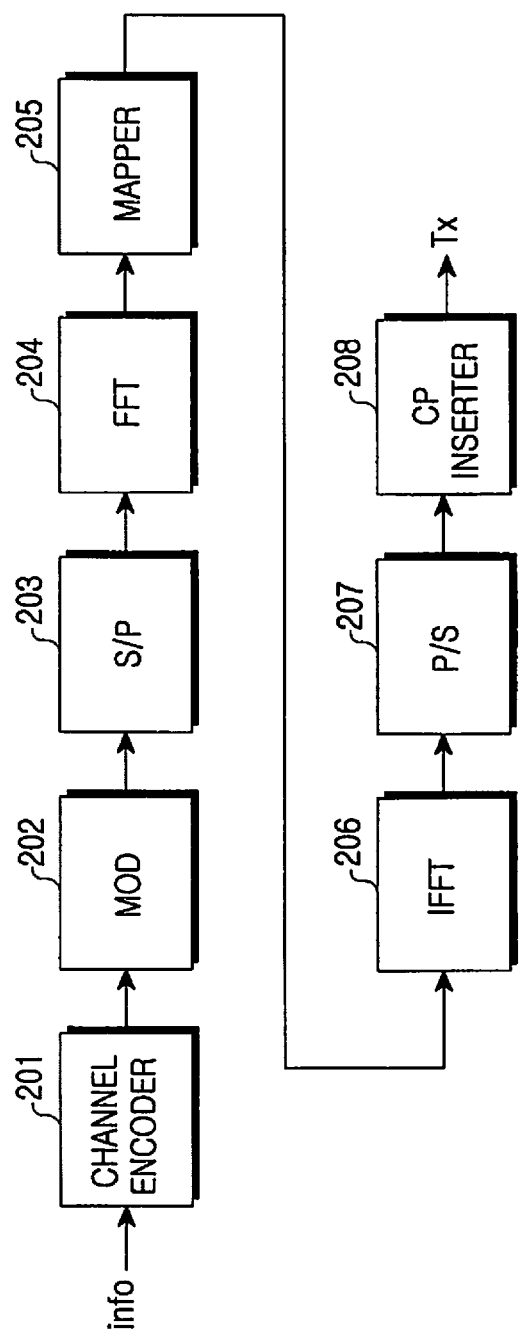
FIG. 2 is a block diagram illustrating a structure of a transmitter in a system employing an SC-FDMA scheme, which is a typical uplink transmission scheme.
Figure 3:
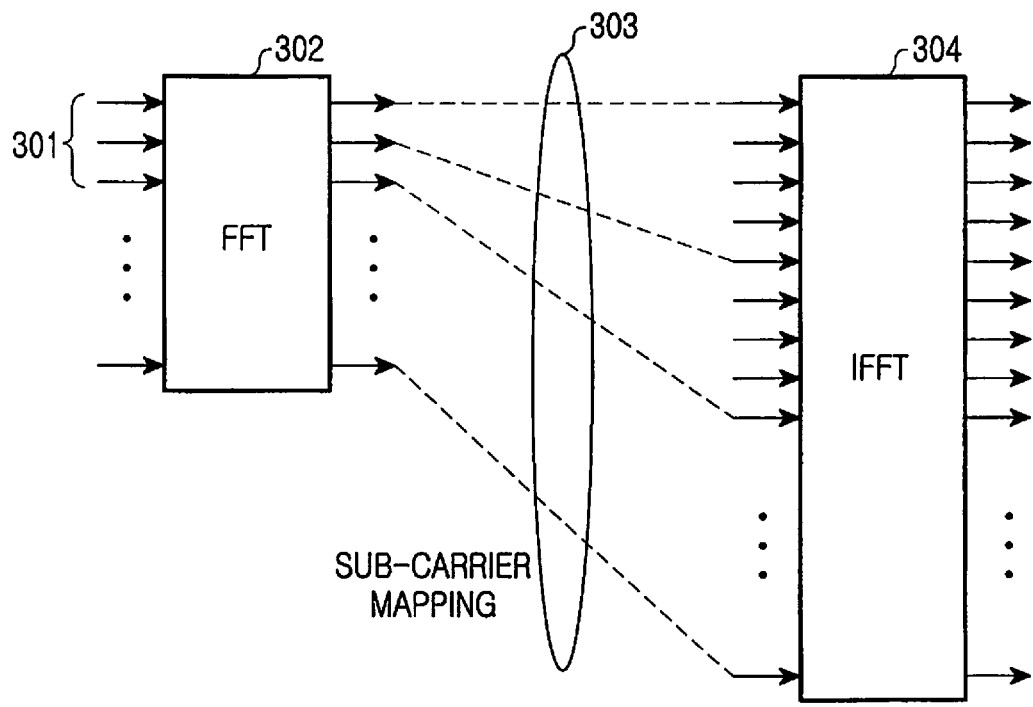
FIG. 3 is a block diagram illustrating in more detail the structure for resource mapping shown in FIG. 2.

The information multiplexed by the multiplexer 1015 is mapped to the data resource by a data resource mapper 1021 and is then transmitted. The data resource mapper 1021 includes an FFT (or DFT) block, a sub-carrier mapper, and an IFFT block as described above with reference to FIG. 2. That is, when both the uplink data 1002 and the ACK/NACK 1001 exist, the uplink data 1002 and the ACK/NACK 1001 are multiplexed before the FFT operation. In contrast, when no uplink data exists, the encoded ACK/NACK output through output path 1008 is mapped to a resource (ACK/NACK resource) appointed for the ACK/NACK by an ACK/NACK resource mapper 1020 and is then transmitted.

Figure 11:
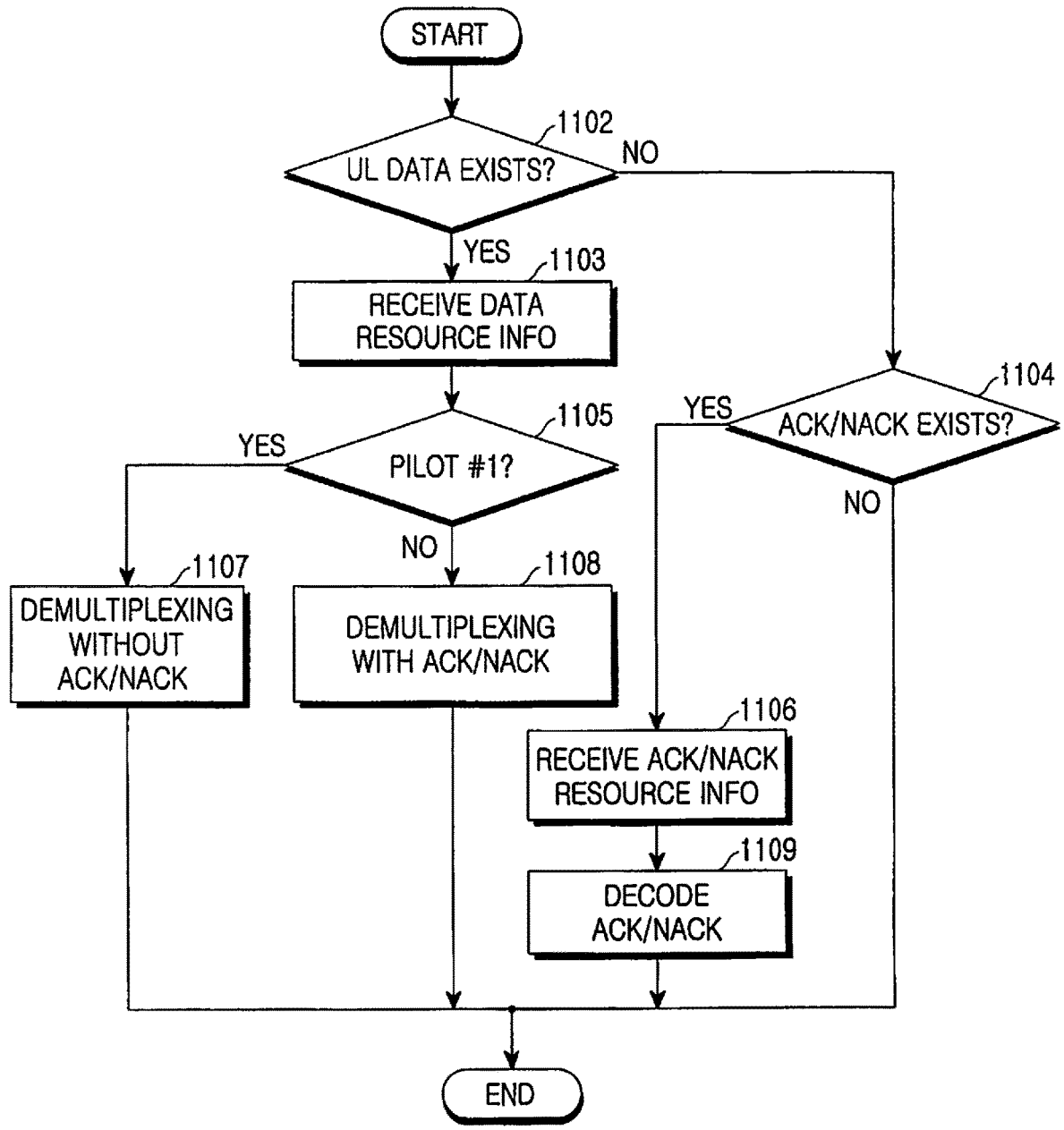
FIG. 11 is a flow diagram of an operation of a receiver according to the first embodiment of the present invention.
Figure 12:
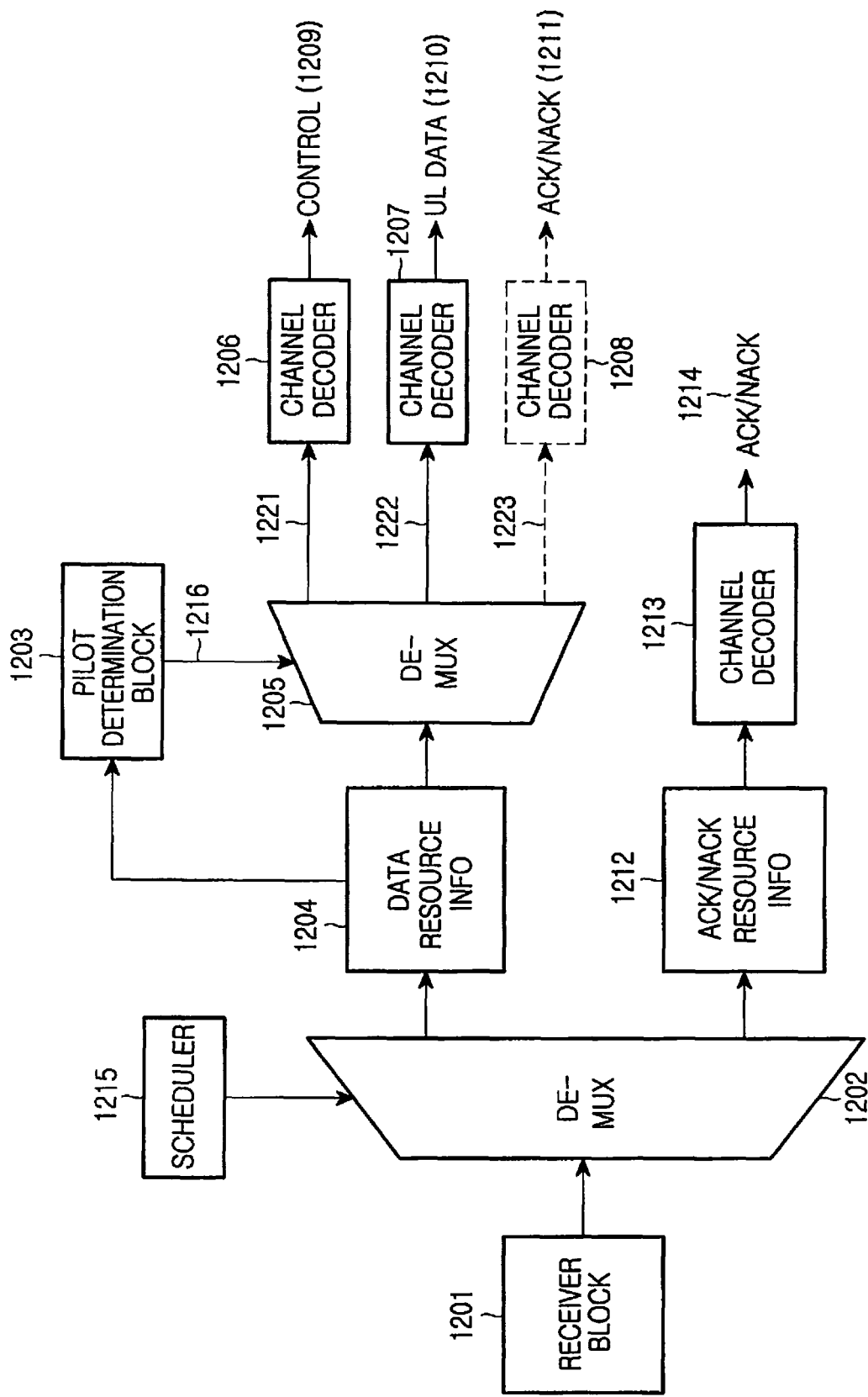
FIG. 12 is a block diagram illustrating the structure of the receiver according to the first embodiment of the present invention.

FIG. 11 shows an operation of a receiver (base station) according to the first embodiment of the present invention, and FIG. 12 shows the receiver (base station). Referring to FIG. 11, when the operation of the base station has started, the base station determines whether it will receive data from the terminal in step 1102. The determination is made as to whether the base station will receive data from the terminal based on whether the base station has allocated a data resource for uplink to the terminal. When the determination in step 1102 concludes that data exists to be received, the base station receives information through a resource allocated for the data, that is, through the data resource in step 1103, and determines the pattern of the pilot signal included in the data resource in step 1105.

In step 1105, the base station determines the pilot pattern of the pilot signal by correlating the pilot signal with pilot pattern #1 and pilot #2, which are already known, by using a correlator, etc. When the pilot signal has pilot pattern #1, the base station determines that the data resource does not include ACK/NACK, and acquires the uplink data and control information through demultiplexing and decoding of the received information. In contrast, when the pilot signal has pilot pattern #2, the base station determines that the data resource includes ACK/NACK, and acquires the uplink data, control information, and ACK/NACK through demultiplexing and decoding of the received information. When the terminal does not clearly inform the base station of whether to transmit ACK/NACK, the base station may determine whether it will receive ACK/NACK, according to whether a downlink scheduler has previously allocated the resource for the downlink data, instead of using the pilot pattern of the pilot signal in step 1105.

When the determination in step 1102 concludes that no data is to be received, the base station determines in step 1104 whether ACK/NACK exists to be received, based on whether a downlink scheduler has previously allocated the resource for the downlink data. When ACK/NACK exists to be received, the base station receives information through the resource (ACK/NACK resource) allocated for ACK/NACK in step 1106, and acquires ACK/NACK by decoding the received information in step 1109. When the determination in step 1104 concludes that no ACK/NACK is to be received, the process is terminated.

Referring to FIG. 12, the base station receives a radio signal through a receiver block 1201. Then, a demultiplexer (DEMUX) 1202 demultiplexes the radio signal and then extracts a signal for a specific terminal. At this time, the DEMUX 1202 operates by using a control signal of a scheduler 1215. That is, when a data resource has been allocated to the terminal by the scheduler 1215, the DEMUX 1202 outputs only the data resource information 1204 in the extracted signal. In contrast, when receiving the ACK/NACK without data, the DEMUX 1202 outputs only the ACK/NACK resource information 1212 in the extracted signal. A channel decoder 1213 decodes the ACK/NACK resource information 1212 and outputs the decoded ACK/NACK.

The data resource information 1204 is provided to a pilot determination block 1203 and a demultiplexer (DEMUX) 1205. The pilot determination block 1203 determines the pilot pattern of the pilot signal included in the data resource information 1204, and makes a determination based on the pilot pattern whether the ACK/NACK exists. Based on a result of the determination, a control signal 1216 indicating existence or absence of the ACK/NACK is input to the DEMUX 1205. When the control signal 1216 indicates that the ACK/NACK exists, the DEMUX 1205 demultiplexes the demultiplexed information 1204 again into encoded uplink data 1222, encoded control information 1221, and encoded ACK/NACK 1223. The outputs 1221, 1222, and 1223 of the DEMUX 1205 are decoded by the channel decoders 1206, 1207, and 1208 and are then output as uplink data 1210, control information 1209, and ACK/NACK 1211.

In contrast, when the control signal 1216 indicates that no ACK/NACK exists, the DEMUX 1205 demultiplexes the demultiplexed information 1204 again into encoded uplink data 1222 and encoded control information 1221. The outputs 1221 and 1222 of the DEMUX 1205 are decoded by the channel decoders 1206 and 1207 and are then output as uplink data 1210 and control information 1209. At this time, the channel decoder 1208 for the ACK/NACK 1211 does not operate.

Second Embodiment

According to the second embodiment of the present invention, an ACK/NACK field of one bit or multiple bits is arranged within control information. When ACK/NACK is transmitted together with uplink data, the ACK/NACK is carried by the ACK/NACK field predefined in the control information. Therefore, only the encoded data and encoded control information are multiplexed before resource mapping. The ACK/NACK field is set to have a value indicating ACK or NACK according to success or failure in reception of downlink data when ACK/NACK exists. Otherwise, the ACK/NACK field is set to have a value indicating or the NACK.

Figure 13:
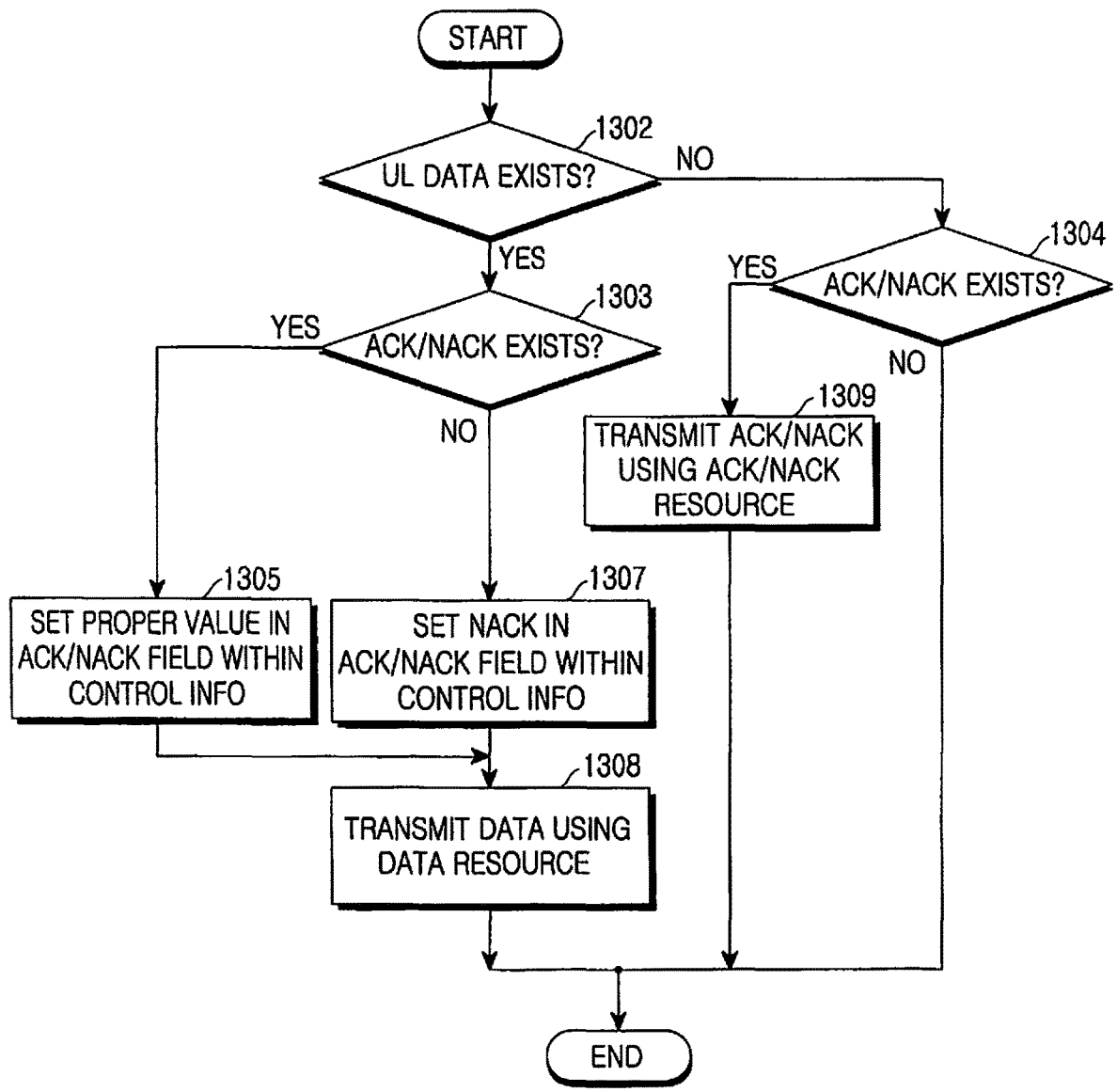
FIG. 13 is a flow diagram of an operation of a transmitter according to the second embodiment of the present invention.
Figure 14:
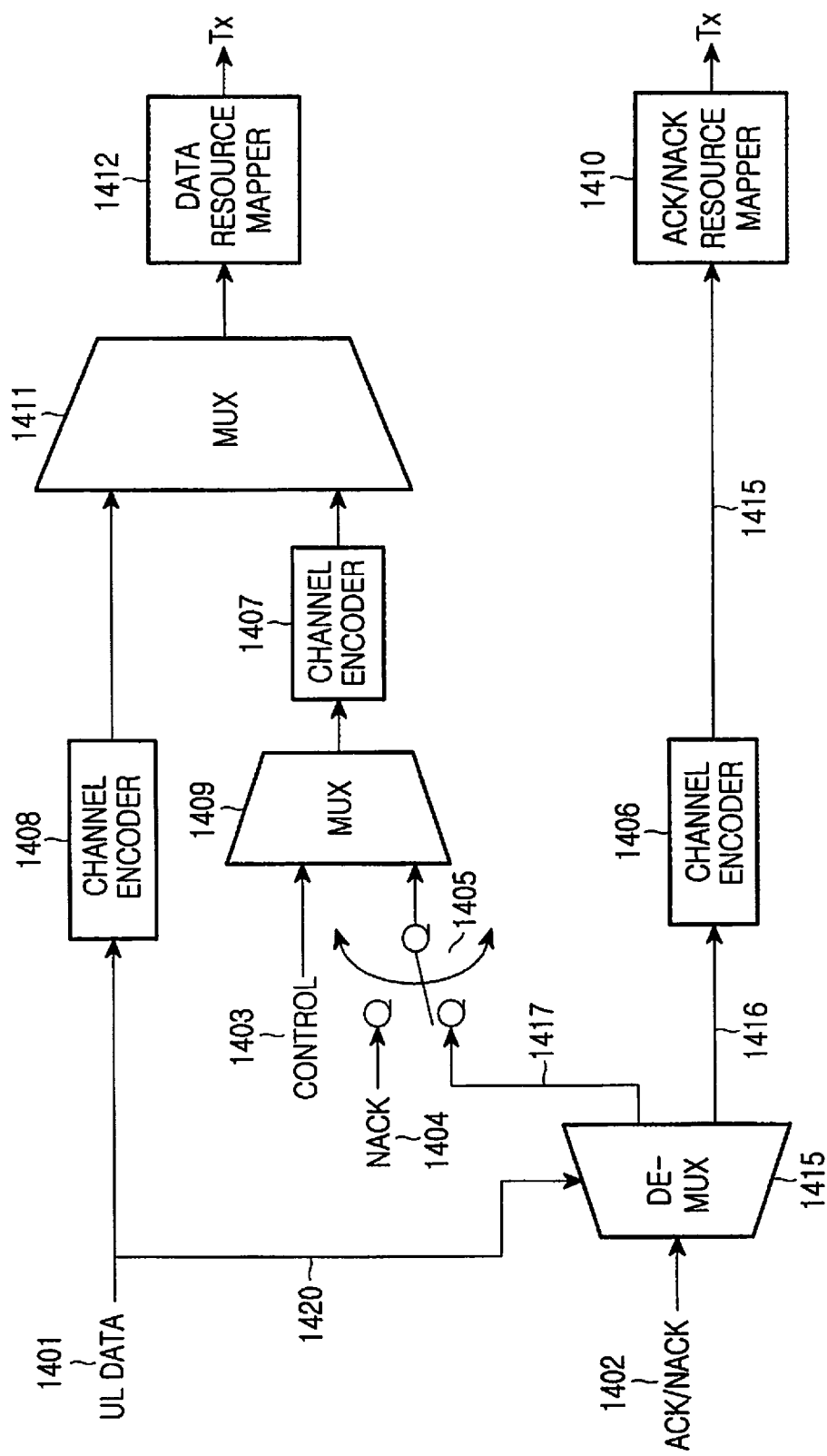
FIG. 14 is a block diagram illustrating the structure of the transmitter according to the second embodiment of the present invention.

FIG. 13 shows an operation of a transmitter (terminal) according to the second embodiment of the present invention, and FIG. 14 shows the transmitter (terminal). Referring to FIG. 13, when the operation of the terminal has started, the terminal determines whether data exists to be transmitted in step 1302. When data exists to be transmitted by the terminal, the terminal is instructed through scheduling of the base station, etc. When the determination in step 1302 concludes that data exists to be transmitted and the base station has allocated a resource for transmission of the data, the terminal determines whether ACK/NACK exists to be transmitted in step 1303. The determination of whether ACK/NACK exists to be transmitted is performed through an HARQ operation for downlink data, and is based on whether the downlink data has been received.

When it has been determined in step 1303 that there is ACK/NACK to be transmitted, the terminal sets ACK/NACK in the ACK/NACK field of control information and multiplexes the data and control information in step 1305. Then, in step 1308, the terminal maps the multiplexed information to the data resource and then transmits the mapped information. In contrast, when it has been determined in step 1303 that no ACK/NACK is to be transmitted, the terminal sets NACK in the ACK/NACK field of control information and multiplexes the data and control information in step 1307. Then, in step 1308, the terminal maps the multiplexed information to the data resource and then transmits the mapped information.

Meanwhile, when the determination in step 1302 concludes that no uplink data is to be transmitted, the terminal determines whether ACK/NACK exists to be transmitted in step 1304. When ACK/NACK exists to be transmitted, the terminal transmits the ACK/NACK by using a resource allocated for the ACK/NACK, that is, by using the ACK/NACK resource in step 1309. In contrast, when no ACK/NACK is to be transmitted, the process is terminated.

Referring to the transmitter shown in FIG. 14, the uplink data 1401 is encoded by a channel encoder 1408 and is then input to a multiplexer (MUX) 1411. In contrast, the ACK/NACK 1402 indicating success or failure in reception of downlink data is transferred through a demultiplexer (DEMUX) 1415 to output path 1417 or output path 1416 according to the control signal 1420 indicating existence or absence of the uplink data 1401. When the uplink data 1401 is not transmitted, the ACK/NACK 1402 transferred to output path 1416 is subjected to encoding, such as repetition encoding by a channel encoder 1406, and is then transmitted using an ACK/NACK resource by an ACK/NACK resource mapper 1410.

When the uplink data 1401 is not transmitted, the ACK/NACK 1402 transferred to output path 1417 is input to the switch 1405. The switch 1405 selects between a predetermined NACK 1404 and the ACK/NACK 1402. Specifically, the switch 1405 selects the ACK/NACK 1402 when the ACK/NACK 1402 exists in output path 1417, and selects the NACK 1404 when the ACK/NACK 1402 does not exist in output path 1417.

The output of the switch 1405 is multiplexed with control information 1403 by a MUX 1409, and the multiplexed information is encoded by a channel encoder 1407 and is then input to the multiplexer (MUX) 1411. The MUX 1411 multiplexes the data encoded by the channel encoder 1408 and the control information encoded by the channel encoder 1407, and the multiplexed information is then transmitted using the data resource by a data resource mapper 1412.

In the transmitter as described above, when uplink data exists, the ACK/NACK is encoded and transmitted together with control information. At this time, the control information including the ACK/NACK uses a superior decoding performance than the control information that does not include the ACK/NACK. This is because an error requirement of the control information is usually lower than an error requirement of the ACK/NACK. In the structure shown in FIG. 14, the control information and the ACK/NACK are simultaneously encoded by one channel encoder 1407, and the channel encoder 1407 operates in accordance with the lower error requirement of the ACK/NACK.

When the channel encoding scheme of the control information including the ACK/NACK has a characteristic of unequal error protection, information bits input to the channel encoder 1407 have different error probabilities according to their positions. Therefore, by locating the ACK/NACK field at a position capable of minimizing the error probability within the control information, it is possible to satisfy both the error requirement of the ACK/NACK and the error requirement of the control information. For example, section 4.7.1.2 of 3GPP TS 25.212 v6.6.0 describes a channel encoding scheme having an unequal error protection property which can cause the Most Significant Bit (MSB) to have the lowest error probability. Therefore, when the described channel encoding scheme is used, it is possible to lower the error probability of the ACK/NACK and to properly maintain the error probability of the control information by setting the ACK/NACK field as the MSB within the control information and by using proper transmission power.

Figure 15:
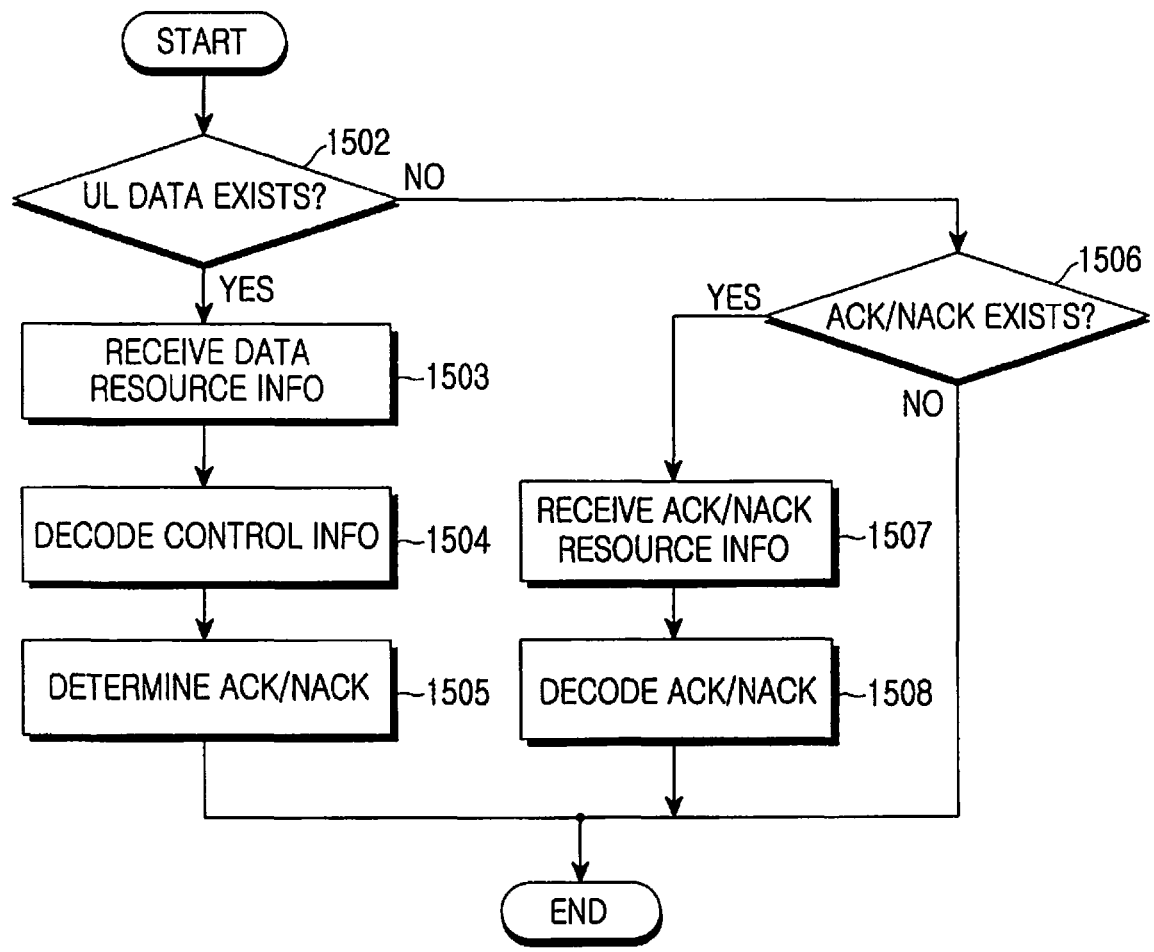
FIG. 15 is a flow diagram of an operation of a receiver according to the second embodiment of the present invention.
Figure 16:
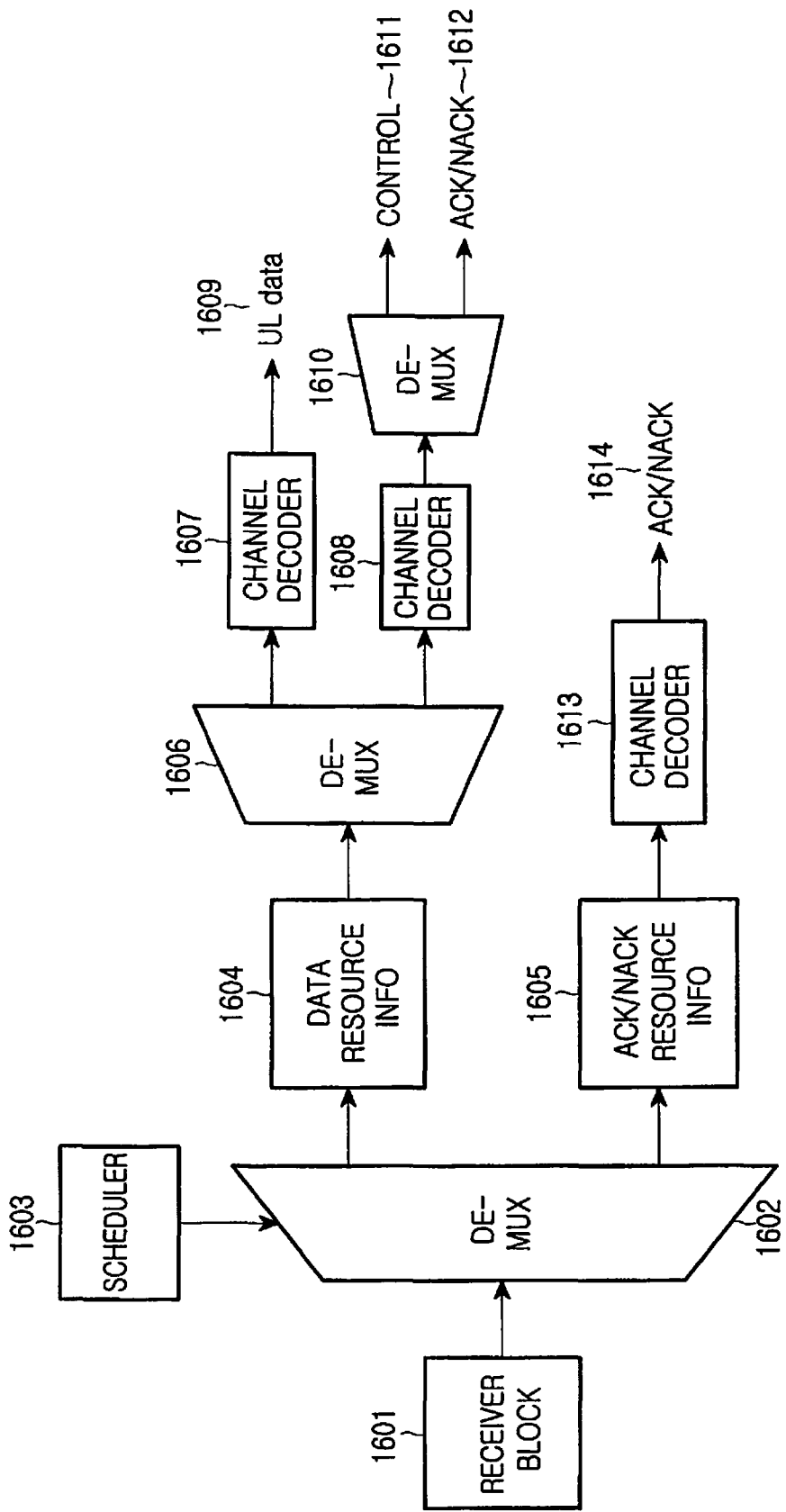
FIG. 16 is a block diagram illustrating the structure of the receiver according to the second embodiment of the present invention.

FIG. 15 shows an operation of a receiver (base station) according to the second embodiment of the present invention, and FIG. 16 shows the receiver (base station). Referring to FIG. 15, when the operation of the base station has started, the base station determines whether the base station will receive data from the terminal in step 1502. The determination of whether the base station will receive data from the terminal is based on whether the base station has allocated a data resource for uplink to the terminal. When the determination in step 1502 concludes that data exists to be received, the base station receives information through a resource allocated for the data, that is, through the data resource in step 1503, decodes control information included in the data resource in step 1504, and obtains the ACK/NACK by reading the ACK/NACK field included in the control information in step 1505.

In contrast, when the determination in step 1502 concludes that no data is to be received, the base station determines in step 1506 whether ACK/NACK exists to be received. When ACK/NACK exists to be received, the base station receives information through the resource (ACK/NACK resource) allocated for the ACK/NACK in step 1507, and acquires ACK/NACK by decoding the received information in step 1508. When the determination in step 1506 concludes that no ACK/NACK is to be received, the process is terminated.

Referring to FIG. 16, the base station receives a radio signal through a receiver block 1601. Then, a demultiplexer (DEMUX) 1602 demultiplexes the radio signal and then extracts a signal for a specific terminal. At this time, the DEMUX 1602 operates by using a control signal of a base station scheduler 1603. That is, when a data resource has been allocated to the terminal by the scheduler 1603, the DEMUX 1602 outputs only the data resource information 1604 in the extracted signal. In contrast, when receiving the ACK/NACK without data, the DEMUX 1602 outputs only the ACK/NACK resource information 1605 in the extracted signal. A channel decoder 1613 decodes the ACK/NACK resource information 1605 and outputs the decoded ACK/NACK 1614.

The data resource information 1604 is demultiplexed into encoded data and encoded control information by a demultiplexer 1606. A channel decoder 1607 obtains the uplink data 1609 by decoding the encoded data. Further, a channel decoder 1608 decodes the encoded control information, and a demultiplexer 1610 demultiplexes the decoded information and separately outputs pure control information 1611 and the ACK/NACK 1612.

Third Embodiment

Hereinafter, a third embodiment of the present invention will be described for a case where the ACK/NACK and the CQI, which are uplink signaling information of uplink data to be transmitted, are multiplexed at the same time, and the uplink data is transmitted at a separate time from that for the uplink signaling information.

Figure 17:
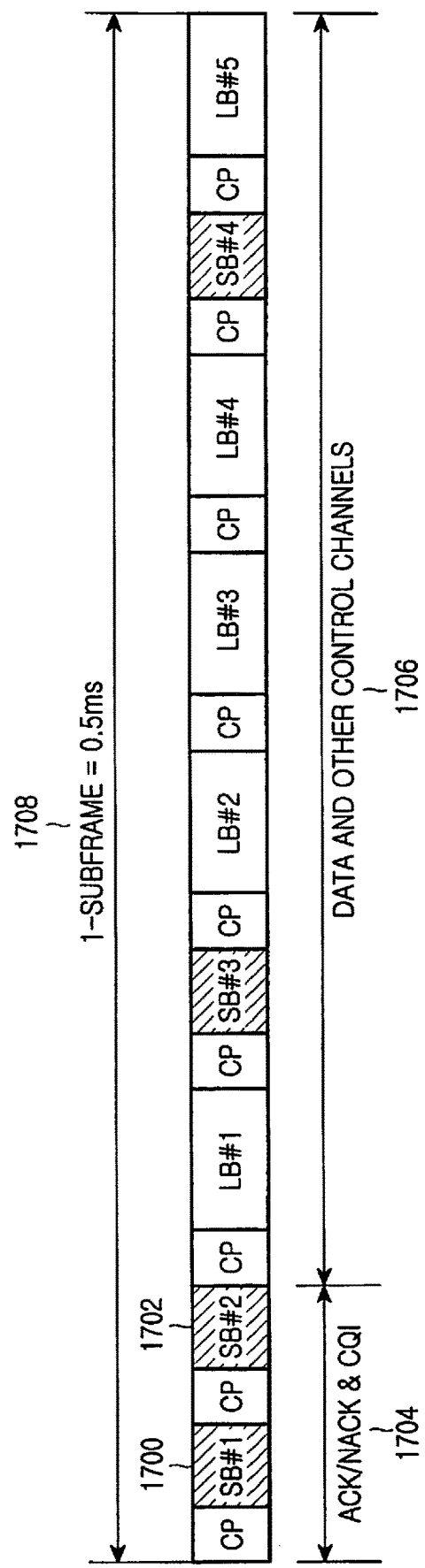
FIG. 17 illustrates a sub-frame according to the third embodiment of the present invention in which the ACK/NACK and the CQI are multiplexed at the same time.

FIG. 17 shows a sub-frame according to the third embodiment of the present invention in which the ACK/NACK and the CQI are multiplexed at the same time. One sub-frame 1708 includes five long blocks LB#1~LB#5, four short locks SB#1, SB#2, SB#3, SB#4, and CPs 511 and 512 located before the blocks one before one. In comparison with the sub-frame shown in FIG. 5, one long block 503 is replaced by two short blocks SB#1, SB#2 1700 and 1702 in the sub-frame shown in FIG. 17.

For example, SB#1 1700 carries ACK/NACK and CQI, and SB#2 1702 carries a pilot used in order to demodulate the ACK/NACK and CQI. Further, the other blocks 1706 carry uplink data, control information, and other information. A pilot used for demodulation of the uplink data can be transmitted through SB#3 or SB#4.

Figure 4:
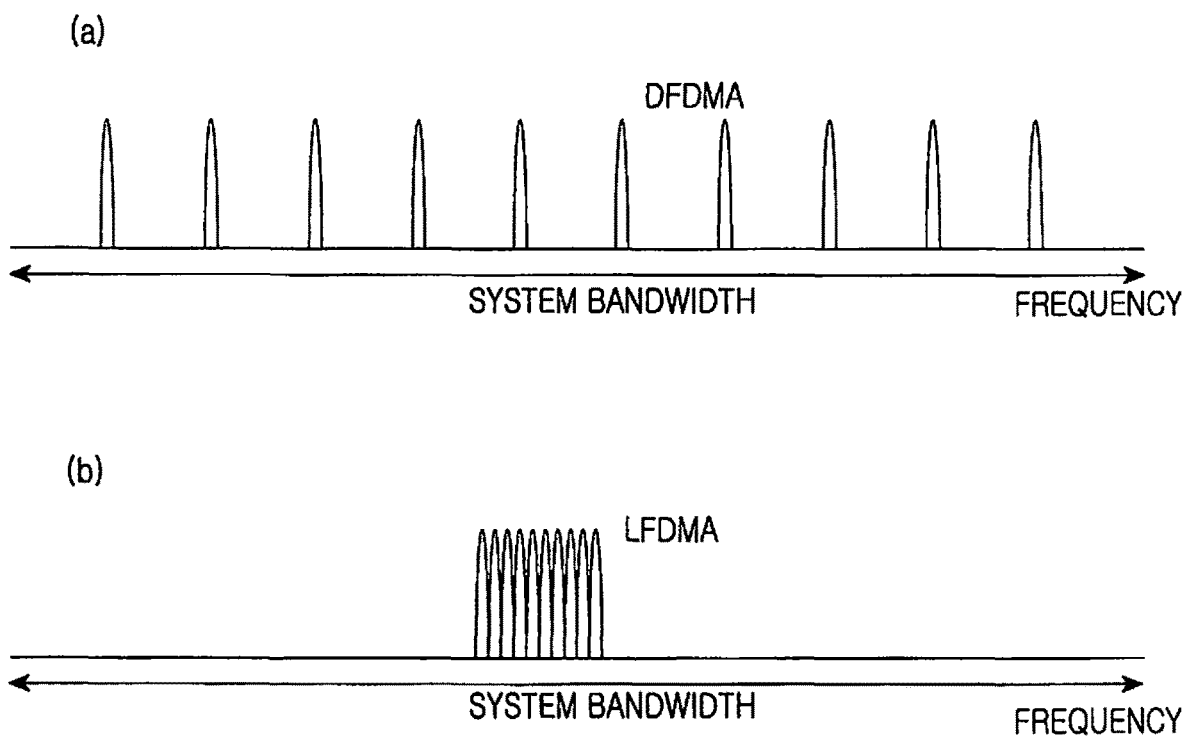
FIG. 4 illustrates views for comparison between the positions of sub-carriers used for the DFDMA and the LFDMA in the frequency domain.
Figure 18:
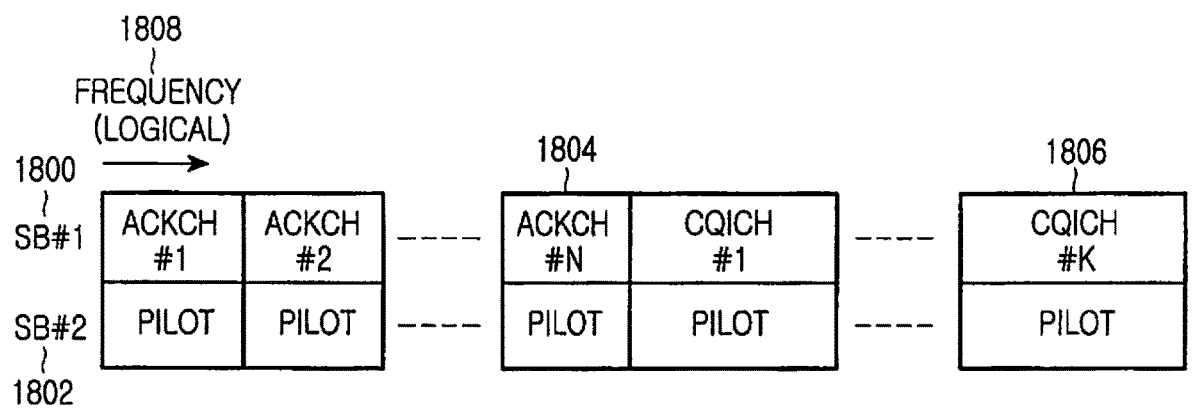
FIG. 18 illustrates use of frequency-time resources according to the third embodiment of the present invention.

FIG. 18 shows an example of mapping of the ACK/NACK and the CQI in the frequency domain, which are carried by SB#1 1800 and SB#2 1802 in the sub-frame shown in FIG. 17. In FIG. 18, the horizontal axis indicates logical mapping of frequency resources 1808. As shown, N number of ACK/NACK channels (ACKCHs) 1804 and K number of CQI channels (CQICHs) 1806 are allocated to the frequency resources of SB#1 1800. According to the applied transmission scheme from among the IFDMA scheme and the LFDMA scheme, the ACK and CQI channels may use a sub-carrier set including discontinuous sub-carriers 401 or continuous sub-carriers 402 in the physical frequency domain as shown in FIG. 4. In order to transmit the ACK/NACK and/or the CQI, a corresponding terminal multiplexes the ACK/NACK and/or the CQI by using an ACK/NACK channel and/or a CQI channel allocated within a corresponding sub-frame (that is, at the same time).

Figure 19:
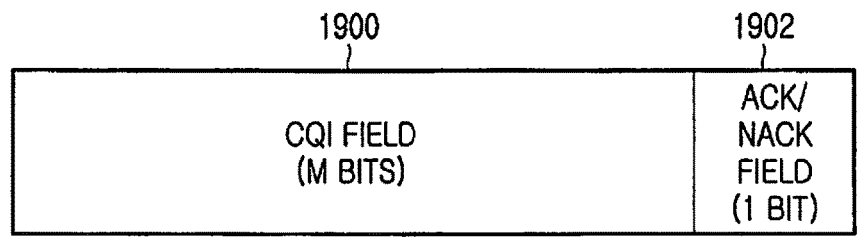
FIG. 19 illustrates a structure of CQI information according to the third embodiment of the present invention.

Therefore, when a terminal simultaneously transmits the ACK/NACK and the CQI, the CQI information transmitted through the CQI channel may have a structure as shown in FIG. 19, in order to enable the ACK/NACK and the CQI to be transmitted by a single sub-carrier.

FIG. 19 shows a structure of CQI information according to the third embodiment of the present invention. Reference numeral 1900 denotes a CQI field, and reference numeral 1902 denotes an ACK/NACK field. Although the ACK/NACK field is expressed to have a size of 1 bit in FIG. 19, the ACK/NACK field may have a size of multiple bits according to a method of expressing the ACK/NACK and the HARQ transmission scheme, etc.

Figure 20:
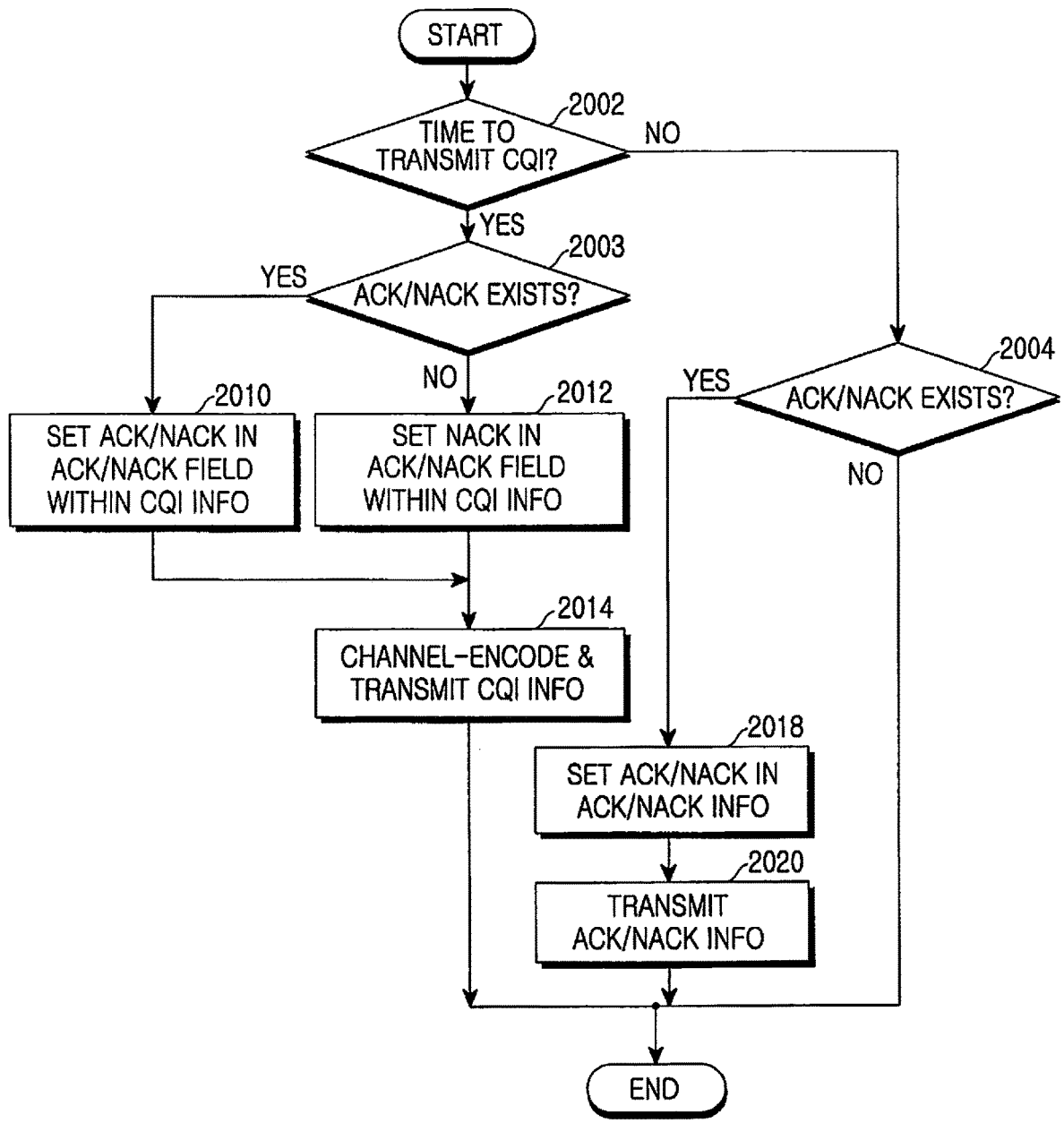
FIG. 20 is a flow diagram of an operation of a transmitter according to the third embodiment of the present invention.

FIG. 20 shows a process for transmitting ACK/NACK and CQI by a transmitter (terminal) according to the third embodiment of the present invention. Upon starting to operate, the terminal determines whether it is the time to transmit CQI (step 2002). The time to transmit CQI is determined, for example, by a specific short block allocated for a CQI channel within a periodically determined specific sub-frame. When it is the time to transmit CQI, the terminal proceeds to step 2003 in which the terminal determines whether ACK/NACK exists to be transmitted.

When the determination in step 2003 concludes that it is necessary to simultaneously transmit both the CQI and the ACK/NACK, the terminal sets a value of ACK/NACK in the ACK/NACK field within the CQI information and sets a CQI value in the CQI field in step 2010. Then, the terminal proceeds to step 2014, in which the terminal channel-encodes both the CQI field and the ACK/NACK field and performs single-carrier transmission through a frequency-time resource (hereinafter, referred to as "CQI resource") allocated to the CQI channel.

When the determination in step 2003 concludes that no ACK/NACK is to be transmitted or it is not the time to transmit the ACK/NACK, the terminal sets NACK in the ACK/NACK field within the CQI information and sets a CQI value in the CQI field in step 2012. Then, the terminal proceeds to step 2014, in which the terminal channel-encodes the CQI information including both the CQI field and the ACK/NACK field and performs the single-carrier transmission.

Meanwhile, when the determination in step 2002 concludes that it is not the time to transmit CQI, the terminal determines whether ACK/NACK exists to be transmitted in step 2004. When ACK/NACK exists to be transmitted and it is the time to transmit the ACK/NACK, the terminal sets a value of ACK/NACK in the ACK/NACK information to be transmitted through the ACK/NACK channel in step 2018. Then, in step 2020, the terminal encodes the ACK/NACK information and then performs single-carrier transmission through a frequency-time resource (hereinafter, referred to as "ACK/NACK resource") allocated to the ACK channel. When the determination in step 2004 concludes that no ACK/NACK is to be transmitted, the process is terminated.

Figure 21:
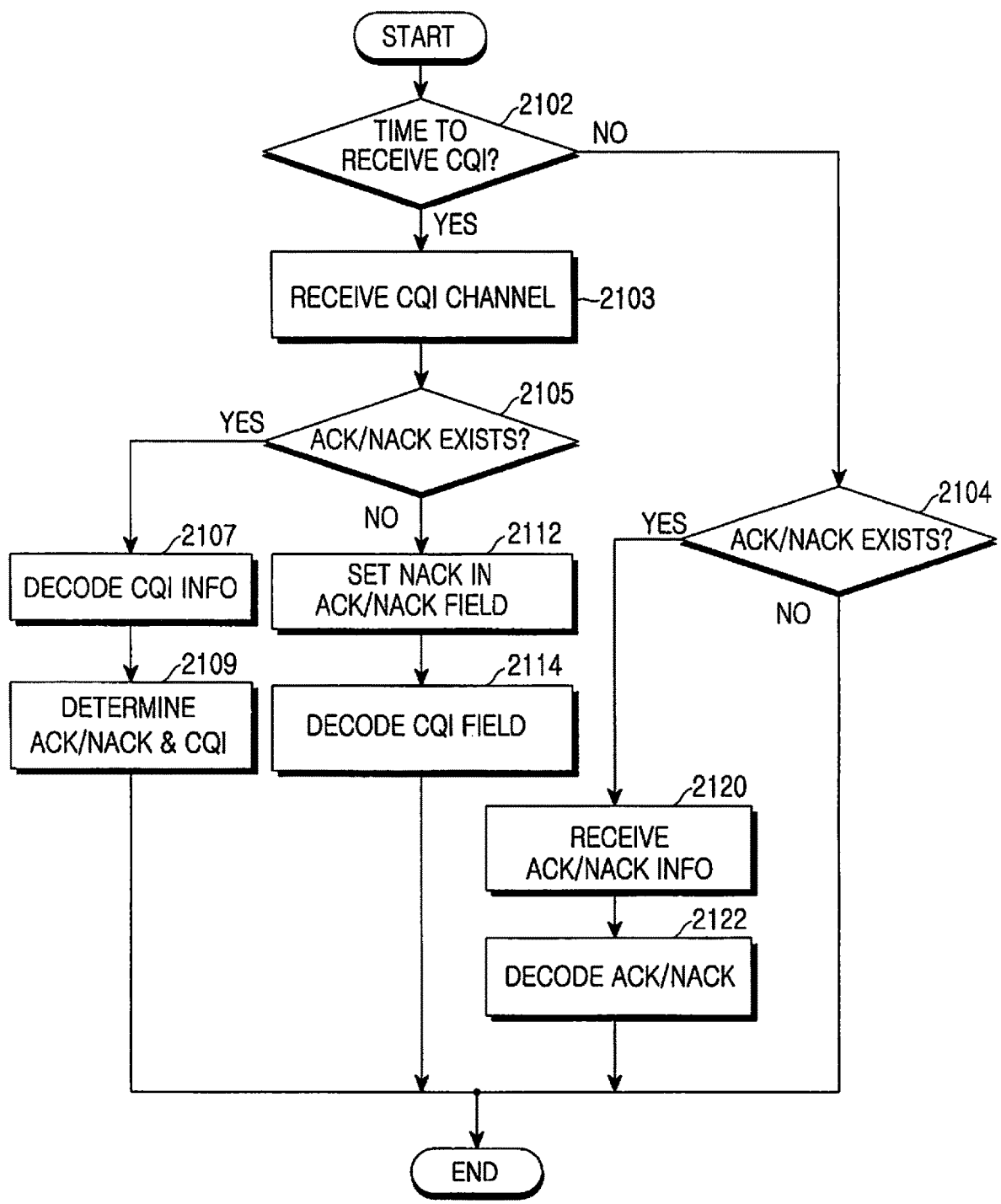
FIG. 21 is a flow diagram of an operation of a receiver according to the third embodiment of the present invention.

FIG. 21 shows an operation of a receiver (base station) according to the third embodiment of the present invention.

According to the third embodiment of the present invention, when only the CQI without the ACK/NACK is transmitted, the ACK/NACK field within the CQI information is set as NACK. Therefore, the receiver (base station) can improve the decoding performance of the CQI decoding by setting the NACK value with a value which the receiver has already known. This method can be also applied when decoding the control information according to the second embodiment of the present invention.

Upon starting to operate, the terminal determines whether it is the time to receive CQI information from the terminal in step 2102. When it is the time to receive CQI information from the terminal, the base station proceeds to step 2103 in which the base station receives the CQI information through a CQI resource. Then, in step 2105, the base station determines whether ACK/NACK exists to be received. Then, when ACK/NACK exists to be received and it is the time to receive the ACK/NACK, the base station proceeds to step 2107 in which the base station decodes the CQI field and the ACK/NACK field included in the CQI information. Then, in step 2109, the base station determines the ACK/NACK and the CQI.

In contrast, when no ACK/NACK is to be received or it is not the time to receive the ACK/NACK, the base station sets a field value of NACK in the ACK/NACK field within the CQI information in step 2112. Then, in step 2114, the base station decodes the CQI field included in the CQI information, thereby determining the CQI. In step 2112, the base station may forcibly set the field value of NACK in the ACK/NACK field.

Meanwhile, when the determination in step 2102 concludes that it is not the time to receive the CQI information, the base station determines whether ACK/NACK exists to be received in step 2104. When ACK/NACK exists to be received and it is the time to receive the ACK/NACK, the base station receives the ACK/NACK information through a resource allocated for the ACK/NACK channel, that is, through the ACK/NACK resource in step 2120. Then, in step 2122, the base station decodes the received ACK/NACK, thereby acquiring the ACK/NACK. When the determination in step 2104 concludes that no ACK/NACK is to be received, the process is terminated.

The present invention presents a scheme for multiplexing and resource mapping of uplink data and uplink signaling information, in order to satisfy the single sub-carrier characteristic in the transmission of the uplink data and uplink signaling information in an SC-FDMA wireless communication system. The present invention can eliminate factors disturbing the single carrier transmission and prevent PAPR increase, which may occur when uplink data occurring according to determination of a scheduler, ACK/NACK occurring according to transmission of downlink data, and uplink signaling information such as CQI indicating the channel status are transmitted without relation to each other.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method performed by a terminal in an orthogonal frequency division multiplexing (OFDM) based communication system, the method comprising:
   identifying whether transmission of acknowledgement information overlaps with transmission of uplink data in a time domain;
   multiplexing the uplink data and the acknowledgement information, in case that the transmission of the acknowledgement information overlaps with the transmission of the uplink data in the time domain; and
   transmitting, to a base station in the OFDM based communication system, the multiplexed uplink data and acknowledgement information on a resource allocated for uplink transmission,
   wherein a first resource associated with the acknowledgement information is located immediately adjacent to a pilot for the uplink data in the time domain, and the pilot is used for demodulation of the uplink data, and
   wherein the acknowledgement information and the uplink data are coded based on different coding schemes, respectively.

2. The method of claim 1, wherein the uplink data is associated with a second resource, and
   wherein the first resource associated with the acknowledgment information and the second resource associated with the uplink data are adjacent to each other with respect to the time domain.

3. The method of claim 2, wherein the first resource associated with the acknowledgement information and the second resource associated with the uplink data are adjacent to each other with respect to a frequency domain.

4. The method of claim 1, further comprising transmitting, to the base station, the acknowledgement information on a resource allocated for the acknowledgement information, in case that the transmission of the acknowledgement information does not overlap with the transmission of the uplink data in the time domain.

5. The method of claim 1, wherein the first resource associated with the acknowledgement information and a third resource associated with channel state information are adjacent to each other with respect to a frequency domain, in case that the acknowledgement information and the channel state information are multiplexed.

6. A method performed by a base station in an orthogonal frequency division multiplexing (OFDM) based communication system, the method comprising:
receiving, from a terminal in the OFDM based communication system, acknowledgement information and uplink data; and
de-multiplexing the uplink data and the acknowledgement information, in case that reception of the acknowledgement information overlaps with reception of the uplink data in a time domain,
wherein a first resource associated with the acknowledgement information is located immediately adjacent to a pilot for the uplink data in the time domain, and the pilot is used for demodulation of the uplink data, and
wherein the acknowledgement information and the uplink data are decoded based on different coding schemes, respectively.

7. The method of claim 6, wherein the uplink data is associated with a second resource, and
wherein the first resource associated with the acknowledgment information and the second resource associated with the uplink data are adjacent to each other with respect to the time domain.

8. The method of claim 7, wherein the first resource associated with the acknowledgment information and the second resource associated with the uplink data are adjacent to each other with respect to a frequency domain.

9. The method of claim 6, further comprising receiving, from the terminal, the acknowledgement information using a resource allocated for the acknowledgement information, in case that the reception of the acknowledgement information does not overlap with the reception of the uplink data in the time domain.

10. The method of claim 6, wherein the first resource associated with the acknowledgement information and a third resource associated with channel state information are adjacent to each other with respect to a frequency domain, in case that the acknowledgement information and the channel state information are multiplexed.

11. A terminal in orthogonal frequency division multiplexing (OFDM) based communication system, the terminal comprising:
a transceiver; and
a controller configured to:
identify whether transmission of acknowledgement information overlaps with transmission of uplink data in a time domain,
multiplex the uplink data and the acknowledgement information, in case that the transmission of the acknowledgement information overlaps with the transmission of the uplink data in the time domain, and
transmit, via the transceiver, to a base station in the OFDM based communication system, the multiplexed uplink data and acknowledgement information on a resource allocated for uplink transmission,
wherein a first resource associated with the acknowledgement information is located immediately adjacent to a pilot for the uplink data in time domain, and the pilot is used for demodulation o the uplink data, and
wherein the acknowledgement information and the uplink data are coded based on different coding schemes, respectively.

12. The terminal of claim 11, wherein the uplink data is associated with a second resource, and
wherein the first resource associated with the acknowledgment information and the second resource associated with the uplink data are adjacent to each other with respect to the time domain.

13. The terminal of claim 12, wherein the first resource associated with the acknowledgement information and the second resource associated with the uplink data are adjacent to each other with respect to a frequency domain.

14. The terminal of claim 11, wherein the controller is further configured to transmit, via the transceiver, to the base station, the acknowledgement information on a resource allocated for the acknowledgement information, in case that the transmission of the acknowledgement information does not overlap with the transmission of the uplink data in the time domain.

15. The terminal of claim 11, wherein the first resource associated with the acknowledgement information and a third resource associated with channel state information are adjacent to each other with respect to a frequency domain, in case that the acknowledgement information and the channel state information are multiplexed.

16. A base station in an orthogonal frequency division multiplexing (OFDM) based communication system, the base station comprising:
a transceiver; and
a controller configured to:
receive, via the transceiver, from a terminal in the OFDM based communication system, acknowledgement information and uplink data, and
de-multiplex the uplink data and the acknowledgement information, in case that reception of the acknowledgement information overlaps with reception of the uplink data in a time domain,
wherein a first resource associated with the acknowledgement information is located immediately adjacent to a pilot for the uplink data in the time domain, and the pilot is used for demodulation of the uplink data, and
wherein the acknowledgement information and the uplink data are decoded based on different coding schemes, respectively.

17. The base station of claim 16, wherein the uplink data is associated with a second resource, and
wherein the first resource associated with the acknowledgment information and the second resource associated with the uplink data are adjacent to each other with respect to the time domain.

18. The base station of claim 17, wherein the first resource associated with the acknowledgement information and the second resource associated with the uplink data are adjacent to each other with respect to a frequency domain.

19. The base station of claim 16, wherein the controller is further configured to receive, via the transceiver, from the terminal, the acknowledgement information on a resource allocated for the acknowledgement information, in case that the reception of the acknowledgement information does not overlap with the reception of the uplink data in the time domain.

20. The base station of claim 16, wherein the first resource associated with the acknowledgement information and a third resource associated with channel state information are adjacent to each other with respect to a frequency domain, in case that the acknowledgement information and the channel state information are multiplexed.

* * * * *